United States Patent
Korth et al.

(10) Patent No.: US 7,462,221 B2
(45) Date of Patent: Dec. 9, 2008

(54) PROCESS AND DEVICE FOR THE EXTRACTION OF SUBSTANCES FROM SILANE-MODIFIED FILLERS

(75) Inventors: Karsten Korth, Grenzach-Wyhlen (DE); Jürgen Heidlas, Trostberg (DE); Kurt Stork, Abensberg (DE); Rudolf Zobel, Willanzheim (DE)

(73) Assignee: Evonik Degussa GmbH, Essen (DE)

( * ) Notice: Subject to any disclaimer, the term of this patent is extended or adjusted under 35 U.S.C. 154(b) by 630 days.

(21) Appl. No.: 11/157,919

(22) Filed: Jun. 22, 2005

(65) Prior Publication Data
US 2006/0011219 A1    Jan. 19, 2006

(30) Foreign Application Priority Data
Jun. 25, 2004   (DE) .................. 10 2004 030 737

(51) Int. Cl.
*B01D 53/02* (2006.01)
(52) U.S. Cl. ............................ 95/90; 96/108
(58) Field of Classification Search ............ 95/90; 96/108; 106/481
See application file for complete search history.

(56) References Cited

U.S. PATENT DOCUMENTS

| | | | |
|---|---|---|---|
| 3,122,516 A * | 2/1964 | Polmanteer | .............. 524/731 |
| 3,350,345 A | 10/1967 | Vanderbilt | |
| 3,590,065 A | 6/1971 | Rakus | |
| 3,842,111 A | 10/1974 | Meyer-Simon | |
| 3,873,489 A | 3/1975 | Thurn | |
| 3,978,103 A | 8/1976 | Meyer-Simon et al. | |
| 3,997,356 A | 12/1976 | Thurn et al. | ............ 106/288 Q |
| 4,048,206 A | 9/1977 | Voronkov | |
| 4,076,550 A | 2/1978 | Thurn et al. | ............ 106/288 Q |

(Continued)

FOREIGN PATENT DOCUMENTS

DE       33 14742       4/1983

(Continued)

OTHER PUBLICATIONS

Dreschler, et al., "3-Chloropropyltrialkoxysilanes: Key Intermediates for the Commercial Production of Organofunctionalized Silanes and Polysiloxanes," *Agnew. Chem. Int. Ed. Engl.* 25: 236-252 (1986).

(Continued)

*Primary Examiner*—Robert A Hopkins
(74) *Attorney, Agent, or Firm*—Michael A. Sanzo; Law Office of Michael A. Sanzo, LLC

(57) ABSTRACT

Process for the extraction of substances from at least one silane-modified oxidic or silicatic filler, wherein at least one gas compressed by means of pressure and/or temperature is employed as the extraction agent and the compressed gas is led in the radial direction through the filler in the pressure container and/or the substances extracted from the silane-modified filler are removed from the compressed gas with a suitable sorbent. A device for carrying out the process is furthermore described, wherein this comprises at least one pressure container having at least one internal container, sieve or insert for accommodation of the fillers which is permeable to gas and at least one gas feed and gas removal in the bulk bed of filler, and has a radially designed gas feed or gas removal from the bulk bed of filler.

20 Claims, 20 Drawing Sheets

U.S. PATENT DOCUMENTS

| | | | |
|---|---|---|---|
| 4,153,063 A | 5/1979 | Roselius et al. ............. | 131/143 |
| 4,456,718 A | 6/1984 | Brinkmann | |
| 4,514,231 A | 4/1985 | Kerner et al. .............. | 106/445 |
| 4,551,541 A | 11/1985 | Hanisch | |
| 4,798,878 A | 1/1989 | Brinkmann | |
| 5,107,009 A | 4/1992 | Rauleder | |
| 5,637,209 A | 6/1997 | Wright et al. .............. | 210/137 |
| 5,736,484 A | 4/1998 | Polanek | |
| 5,780,538 A | 7/1998 | Cohen | |
| 5,840,952 A | 11/1998 | Kudo | |
| 5,859,275 A | 1/1999 | Munzenberg | |
| 5,914,364 A | 6/1999 | Cohen | |
| 6,133,466 A | 10/2000 | Edelmann et al. ........... | 556/440 |
| 6,140,393 A | 10/2000 | Bomal | |
| 6,331,605 B1 | 12/2001 | Lunginsland | |
| 6,362,253 B1 | 3/2002 | Durel | |
| 6,403,228 B1 | 6/2002 | Mack et al. ................. | 428/447 |
| 6,433,206 B1 | 8/2002 | Gedon | |
| 6,444,013 B1 * | 9/2002 | Helly et al. .................... | 95/116 |
| 6,465,544 B1 | 10/2002 | Bomal | |
| 6,465,672 B2 | 10/2002 | Michel et al. | |
| 6,518,335 B2 | 2/2003 | Reedy | |
| 6,548,594 B2 | 4/2003 | Luginsland | |
| 6,849,754 B2 | 2/2005 | Deschler | |
| 6,893,495 B2 | 5/2005 | Korth et al. ................. | 106/481 |
| 6,995,280 B2 | 2/2006 | Korth | |
| 7,019,160 B2 | 3/2006 | Korth | |
| 7,186,768 B2 | 3/2007 | Korth | |
| 7,332,619 B2 | 2/2008 | Korth | |
| 7,339,067 B2 | 3/2008 | Korth | |
| 7,384,997 B2 | 6/2008 | Hasse | |
| 2003/0083516 A1 | 5/2003 | Korth et al. ................. | 556/450 |
| 2003/0130535 A1 | 7/2003 | Deschler | |
| 2003/0200900 A1 | 10/2003 | Korth et al. ................. | 106/490 |
| 2005/0124821 A1 | 6/2005 | Korth | |
| 2005/0124822 A1 | 6/2005 | Korth | |
| 2006/0052621 A1 | 3/2006 | Korth | |
| 2006/0052622 A1 | 3/2006 | Korth | |
| 2006/0161015 A1 | 7/2006 | Klockmann | |
| 2006/0204422 A1 | 9/2006 | Korth | |

FOREIGN PATENT DOCUMENTS

| | | |
|---|---|---|
| DE | 195 44 469 A1 | 3/1997 |
| DE | 196 51 849 A1 | 6/1998 |
| DE | 199 29 021 | 6/1999 |
| DE | 100 40 678 | 8/2000 |
| DE | 101 22 269 | 11/2002 |
| DE | 103 51 735 B3 | 12/2004 |
| EP | 0 323 699 | 7/1989 |
| EP | 0 652 245 | 5/1995 |
| EP | 0 700 951 | 3/1996 |
| EP | 0 848 006 A2 | 4/1998 |
| EP | 0 949 263 A2 | 10/1999 |
| EP | 0 958 298 | 11/1999 |
| EP | 0 978 525 | 2/2000 |
| EP | 1 002 834 A1 | 5/2000 |
| EP | 1 130 023 A2 | 9/2001 |
| EP | 1 256 604 | 11/2002 |
| EP | 1 357 156 | 10/2003 |
| GB | 1 102 251 | 2/1968 |
| GB | 1 310 379 | 3/1973 |
| JP | 62-181346 | 8/1987 |
| JP | 8-291184 | 11/1996 |
| JP | 2004-99483 | 4/2004 |
| JP | 2005-47846 | 2/2005 |
| WO | WO 99/09036 | 2/1999 |
| WO | WO 02/31040 A2 | 4/2002 |

OTHER PUBLICATIONS

Sorokin, et al., "Synthesis of 1-(Organylthioalkyl)silatranes from 1-(Haloalkyl)silatranes," *J. Gen. Chem.* 69(3): 394-398 (1999). Translated from *Zhurnal Obshchei Khimii* 69(3):407-412 (1999).

Sorokin, et al., "S-(Trimethoxysilymethyl)- and S-(Silatranylmethyl)isothiuronium Halides and Their N-Substituted Derivatives," *Russian J. Gen. Chem.* 74(4): 551-558 (2004). Translated from *Zhurnal Obshchei Khimii* 74(4): 603-610 (2004).

Voronkov, et al., 1-[(Acetylthio)alkyl]silantranes, *J. Gen. Chem. USSR* vol. 45(6): 1367 (Dec. 1975). Translated from *Zhurnal Obschei Khimii* 45(6): 1395 (Jun. 1975).

Voronkov, et al., "1-[(Organothio)alkyl]siltranes," *Russian J. Gen. Chem.* 49(3): 529-536 (Sep. 1979). Translated from *Zhurnal Obshchei Khimii* 49(3): 605-614 (Mar. 1979).

Voronkov, et al., "Photochemical Organithioation of 1-vinysilantrane and its c-methyl Derivatives," *Russian J. Gen. Chem.* 49(6): 1130-1136 (Nov. 1979). Translated from *Zhurnal Obshchei Khimii* 49(6): 1285-1292 (Jun. 1979).

Voronkov, et al., "O,O-Dialkyl-S-(1-Silatranylalkyl) Dithiophosphates," *Bull. Acad. Sci USSR Div. Chem. Sci.* 36(8): 1745-1747 (1988). Translated from *Izvestiya Akademii Nauk SSSR* 8:1882-1884 (Aug. 1987).

English language abstract for DE 195 44 469 A1, cited as reference B2 above. Mar. 27, 1997.

English language abstract for DE 196 51 849 A1, cited as reference B3 above. Jun. 18, 1998.

English language abstract for DE 103 51 51 735 B3, cited as reference B4 above. Dec. 9, 2004.

English language abstract for EP 0 848 006 A2, cited as reference B9 above. Apr. 17, 1998.

English language abstract for EP 1 130 023 A2, cited as reference B12 above. Sep. 5, 2001.

English language abstract for JP 62-181346, cited as reference B20 above. Aug. 8, 1997.

English language abstract for JP 8-291184, cited as reference B21 above. Nov. 5, 1996.

English language abstract for JP 2004-099483, cited as reference B22 above. Apr. 2, 2004.

English language abstract for JP 2005-047846, cited as reference B23 above. Feb. 24, 2005.

* cited by examiner

PROCESS AND DEVICE FOR THE EXTRACTION OF SUBSTANCES FROM SILANE-MODIFIED FILLERS

CROSS REFERENCE TO RELATED APPLICATIONS

The present application claims priority to German application DE 10 2004 030 737.7, filed on Jun. 25, 2004, the contents of which is hereby incorporated by reference in its entirety.

FIELD OF THE INVENTION

The invention relates to a process and device for the extraction of substances from silane-modified fillers.

BACKGROUND OF THE INVENTION

Two primary methods are used for preparing silane-modified fillers such as are used, for example, in the plastics or rubber industry. In one method, organically modified alkoxysilanes Y—R—Si(R'$_x$(OR")$_{3-x}$ are added to fillers to prepare a crude mixture for reinforcing rubber mixtures (U.S. Pat. No. 3,997,356). In a second method, preparations are made from a preformed mixture of organically modified alkoxysilane and filler (DE 3314742, U.S. Pat. No. 4,076,550).

One disadvantage of these mixtures of alkoxysilane and filler is their lack of stability. During storage, small amounts of alcohol are continuously liberated by hydrolysis and condensation of the alkoxysilanes. The material composition and the performance of the filler/silane mixtures change as a result.

EP 1,256,604 discloses a process for the reaction of at least one biopolymeric, biooligomeric, oxidic or silicatic filler in a compressed gas with at least one silane. A high throughput rate of compressed gas is desirable in the process because it is thereby possible to shorten the necessary extraction time or to increase the amount of substance extracted per unit time. In EP 1,256,604, the compressed gas flows axially through the fillers undergoing extraction, or the filters are stirred in a pressure container. It can be seen from the examples that the axial flow of supercritical $CO_2$ through the filler depends greatly on the particle size distribution of the fillers and on the length of the autoclave container used. For economic reasons, pressure autoclaves, particularly those used in large production installations, are usually designed as slim, long containers.

A disadvantage of the procedure is that, at the desired high throughput rates of compressed gases, high differences in pressure occur between gas entry and gas exit in the extractions, and this can damage components of the installation (in particular the sintered plates which retain the extraction material). There is also the risk of the formation of channels, with the consequence of a non-uniform flow through the bulk material and, as a result, a non-uniform extraction of the fillers. If only low throughput rates of compressed gases are used in order to keep the differences in pressure low, this leads to long extraction times. In the specific case of finely divided pulverulent fillers, only unsatisfactory throughputs of compressed gases can be realized in practice in this way. This is an obstacle to utilization of the process on an industrial scale.

EP 1,357,156 discloses a process for the preparation of a low-dust, microbeaded or microgranular, silane-modified oxidic or silicatic filler in a compressed gas. A disadvantage of this process is that the separator which is described as a constituent of the experimental apparatus and in which the compressed gas is decompressed does not adequately separate substances that are in the compressed gas and are extracted from the filler. This lack of separation leads to recontamination of the compressed gas in the course of the extraction. As a consequence, substances such as ethanol, are transported through and out of the separator and accumulate in other parts of the pressure apparatus, for example in the buffer tank.

Compressed or liquefied gas in the buffer tank can establish a solution equilibrium of the substances transported through and out of the separator. As a consequence, the compressed gas fed back to the pressure autoclave from the buffer tank is not substance-free, and this results in a reduced uptake capacity (loading capacity) of the compressed gas in the extraction tank which, in turn, results in a lower substance uptake of the compressed gas in the pressure autoclave. The reduced loading capacity of the compressed gas, for example for ethanol, therefore results in prolonged extraction times for the removal of substances from the silane-modified filler. This makes the procedure unattractive for use on an industrial scale.

OBJECT OF THE INVENTION

The object of the present invention is to provide a process for the effective extraction of substances from silane-modified fillers. The process is designed to allow compressed gases to pass through a bulk bed of filler at a high rate, with an effective extraction of the filler simultaneously taking place. In addition, the process provides for the effective removal of the extracted substances from the compressed gas.

SUMMARY OF THE INVENTION

The invention is directed to a process for the extraction of substances from at least one silane-modified oxidic or silicatic filler, which is characterized in that at least one gas compressed by means of pressure and/or temperature is employed as the extraction agent and the compressed gas is passed in the radial direction through the filler in the pressure container and/or the substances extracted from the silane-modified filler are removed from the compressed gas with a suitable sorbent.

Thus, in one embodiment, the compressed gas that acts as the extracting agent is passed in a radial direction through the filler in the pressure container and in a second, separate embodiment, substances extracted from the silane-modified filler are removed from the compressed gas with a suitable sorbent. These embodiments may also be combined such that the gas serving as the extracting agent is passed in a radial direction through the filler in the pressure container and substances extracted from the silane-modified filler are then removed from the gas with a sorbent. Circulation of the compressed gas in a closed apparatus can be performed if this is complemented with a sorption device for removal of the substances dissolved in the compressed gas.

The process according to the invention is preferably carried out under uniform conditions in which the compressed gas flows radially through the bulk material and extraction of substances from the filler is combined with a subsequent sorption of the substances. "Uniform conditions" means that the pressure during the process does not vary by more than +/−50 bar, preferably by not more than +/−25 bar, more preferably by not more than +/−10 bar, and still more preferably by not more than +/−5 bar.

The invention also includes devices that can be used for carrying out the processes described above. The main characteristic of these devices is the presence of a pressure container which has a gas permeable insert in which filler is held during extraction. The insert serves to separate filler from the outer walls of the pressure container and from a central axial space that serves as a tube for the flow of gas into or out of the pressure container. This tube may be part of the insert or may be a separate device such as a hollow pipe in the centre of the insert. This arrangement allows gas to flow radially through filler either into or away from the central axial tube or pipe.

DETAILED DESCRIPTION OF THE INVENTION

Terms which are relevant to the invention and common to all the embodiments, are, unless otherwise indicated, defined as follows:

Axial flow-through means a flow-through parallel to the symmetric axis of rotation of a cylindrically designed pressure container. Axial flow-through can also be understood as meaning that the compressed gas flows through a layer thickness of the silane-modified filler which is greater than the layer thickness of the filler perpendicular to the direction of flow of the compressed gas.

Radial flow-through means a flow-through transversely to the symmetric axis of rotation of a cylindrically designed reaction vessel. Radial flow-through can also be understood as meaning that the compressed gas flows through a layer thickness of the silane-modified filler which is smaller than the layer thickness of the filler perpendicular to the direction of flow of the compressed gas.

Sorption will be understood as meaning adsorption, absorption or chemisorption.

Sorbent will be understood as meaning all substances or materials of synthetic or natural origin which selectively or non-selectively take up a substance with which they are in contact. The uptake can comprise or include physical interactions and also chemical reactions of the substances or materials with one another. For example, for adsorption, the separating of substances from a compressed gas can take place on or in materials such as zeolites or active charcoals.

The compressed gas used in the processes described herein can be passed, for example, through a sorbent layer serving as an adsorbent in a pressure container. Zeolites, active charcoals, silicas, water, silica gels or other porous substances or materials of high surface area can be employed as the sorbent layer. For example, the absorption can be carried out by washing substances out of the compressed gas with water. The washing out can be carried out under pressure, e.g., at 1-2,000 bar, preferably 1-300 bar, particularly preferably 10-150 bar, very particularly preferably 10-120 or at atmospheric pressure.

Figure 1:
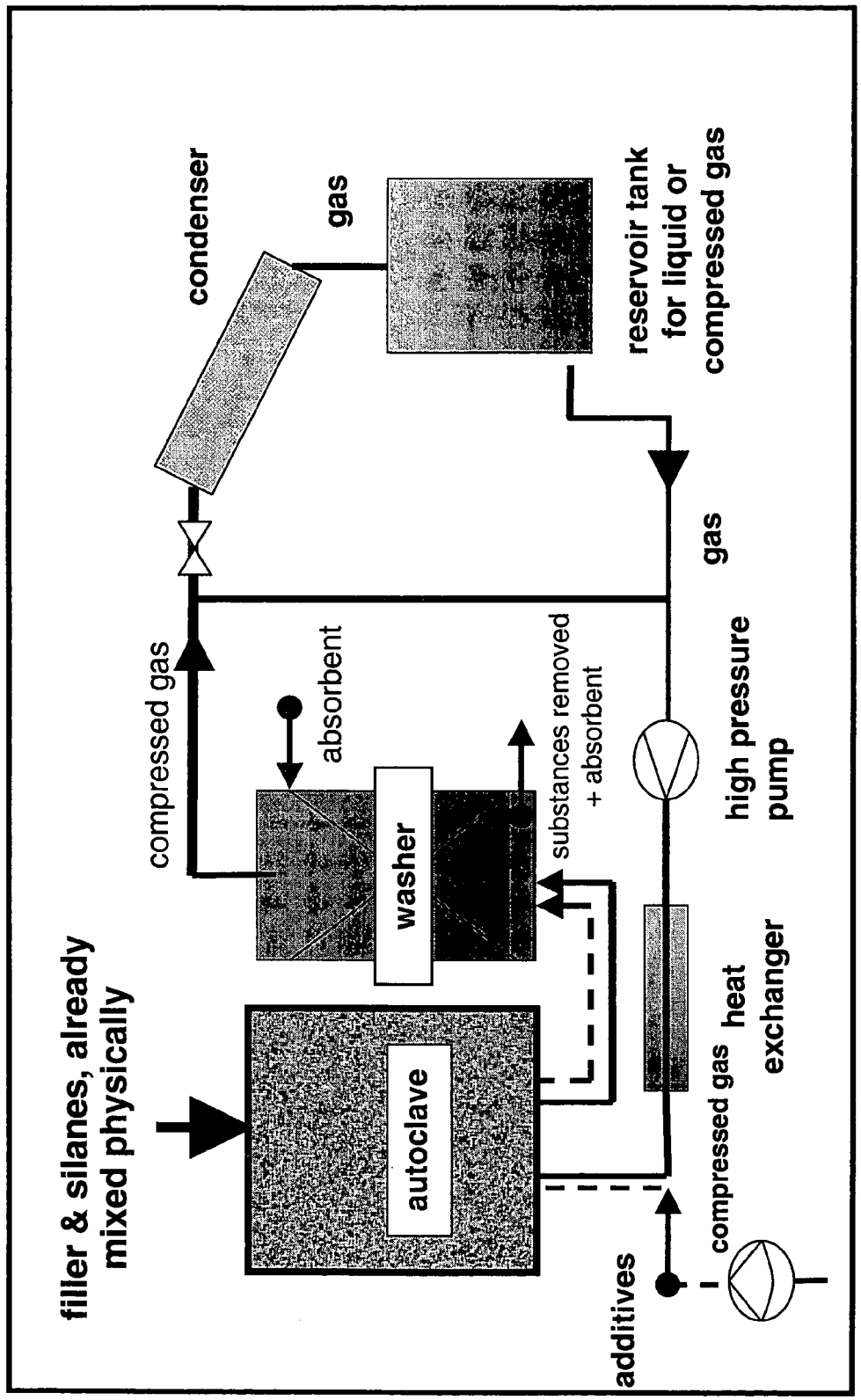
FIGS. 1-11 and 20: These figures show various installations that can be used for carrying out the extraction of silane-modified oxidic or silicatic fillers using the process of the present invention.
Figure 2:
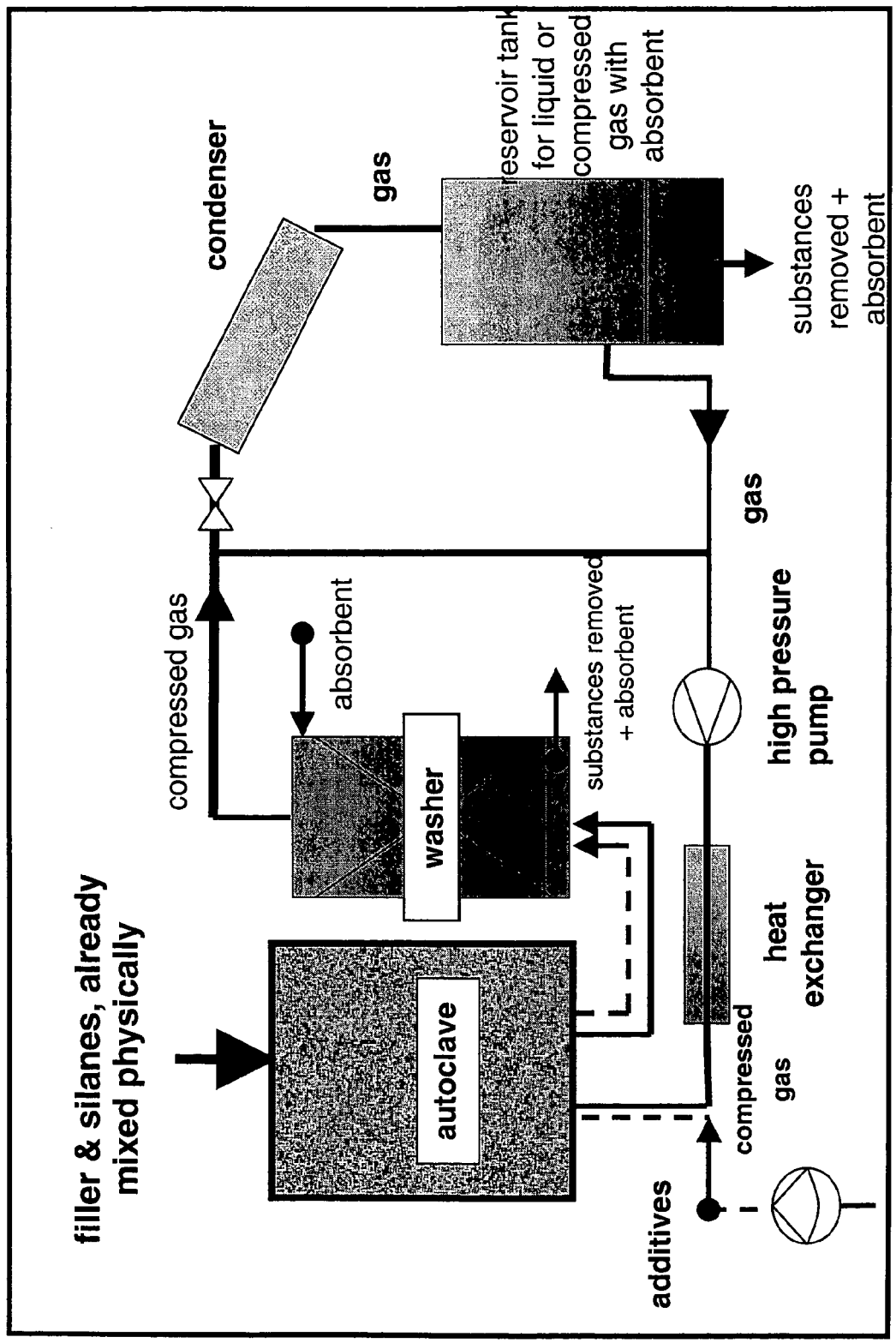
Figure 3:
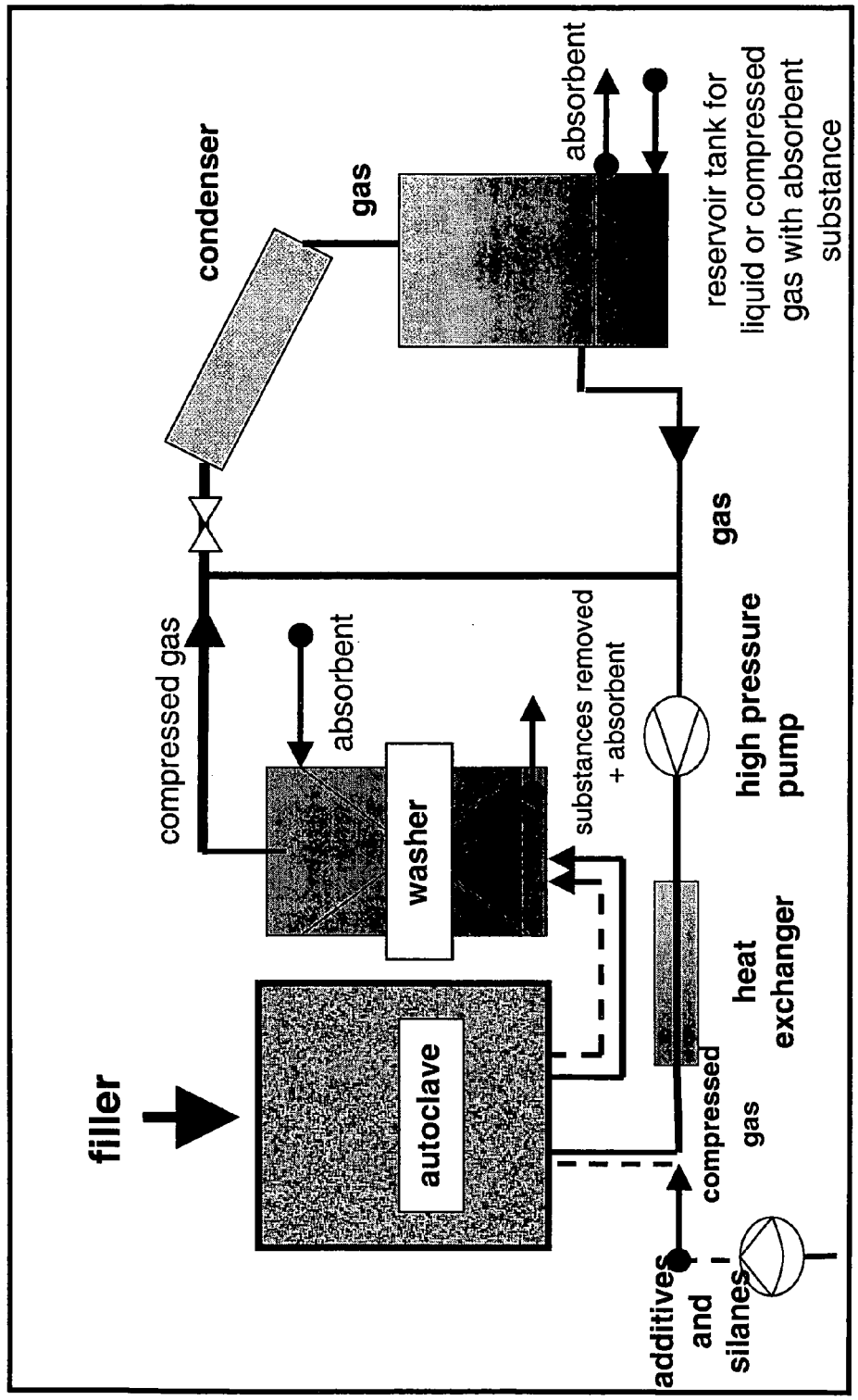
Figure 4:
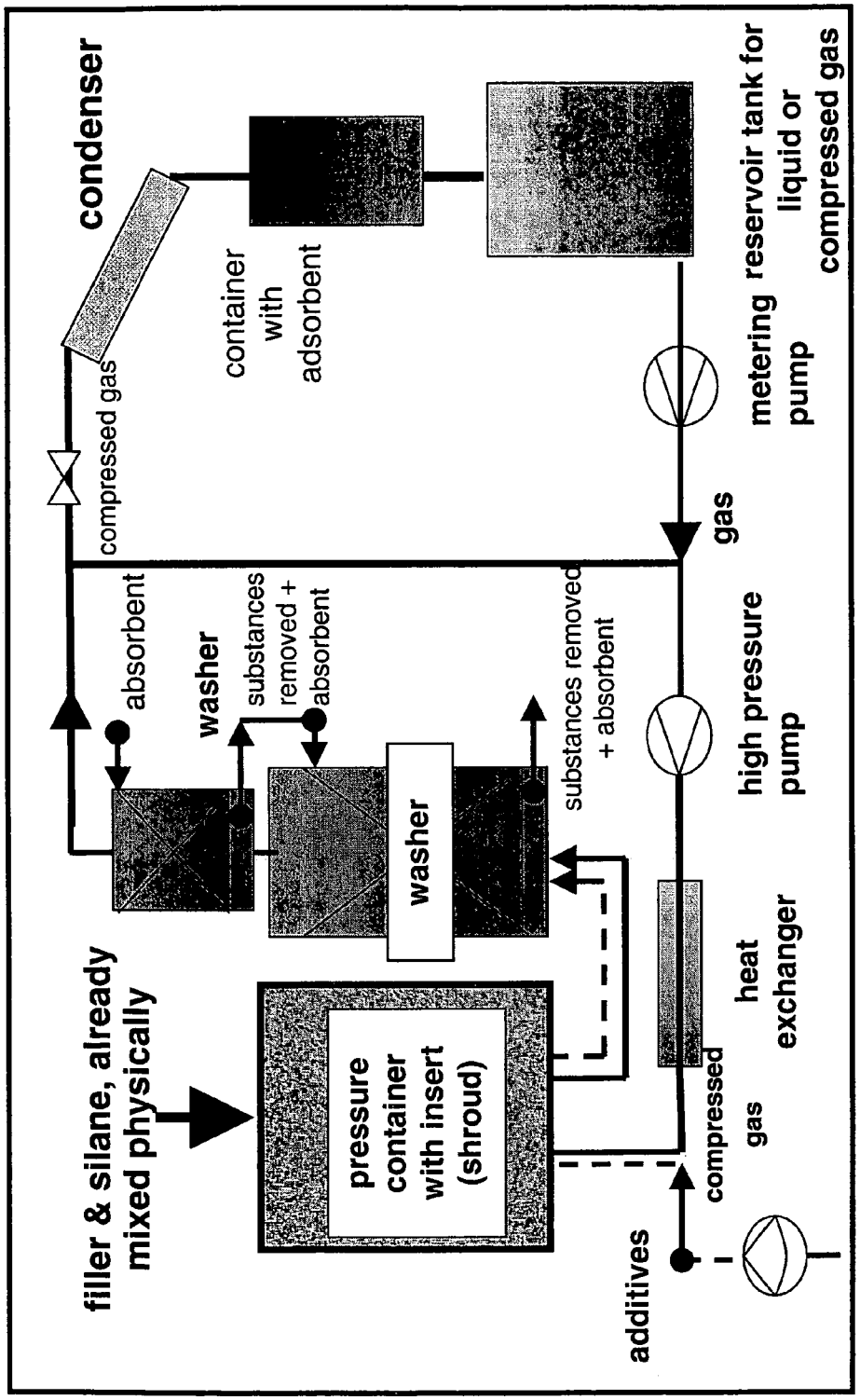
Figure 5:
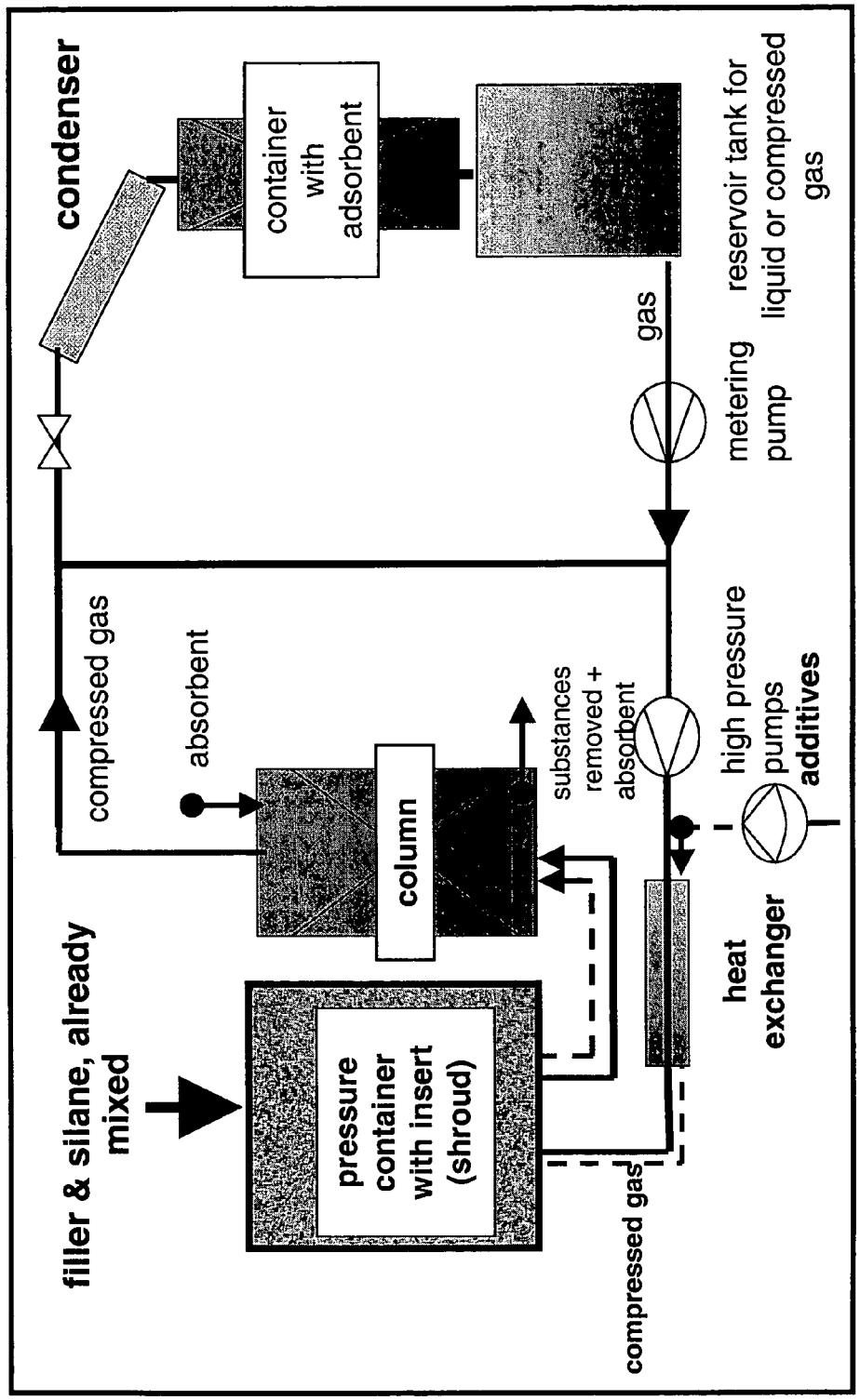
Figure 6:
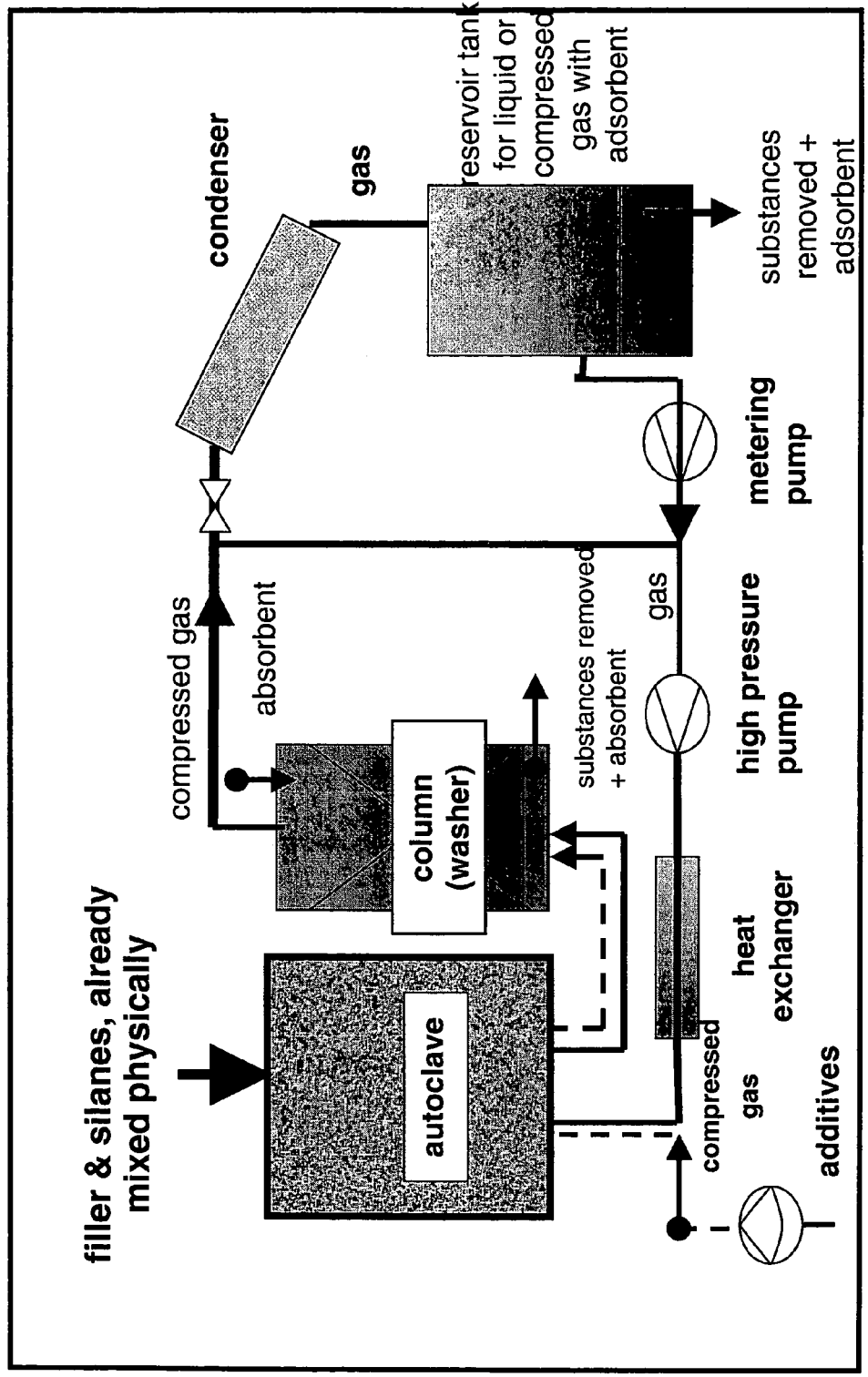
Figure 7:
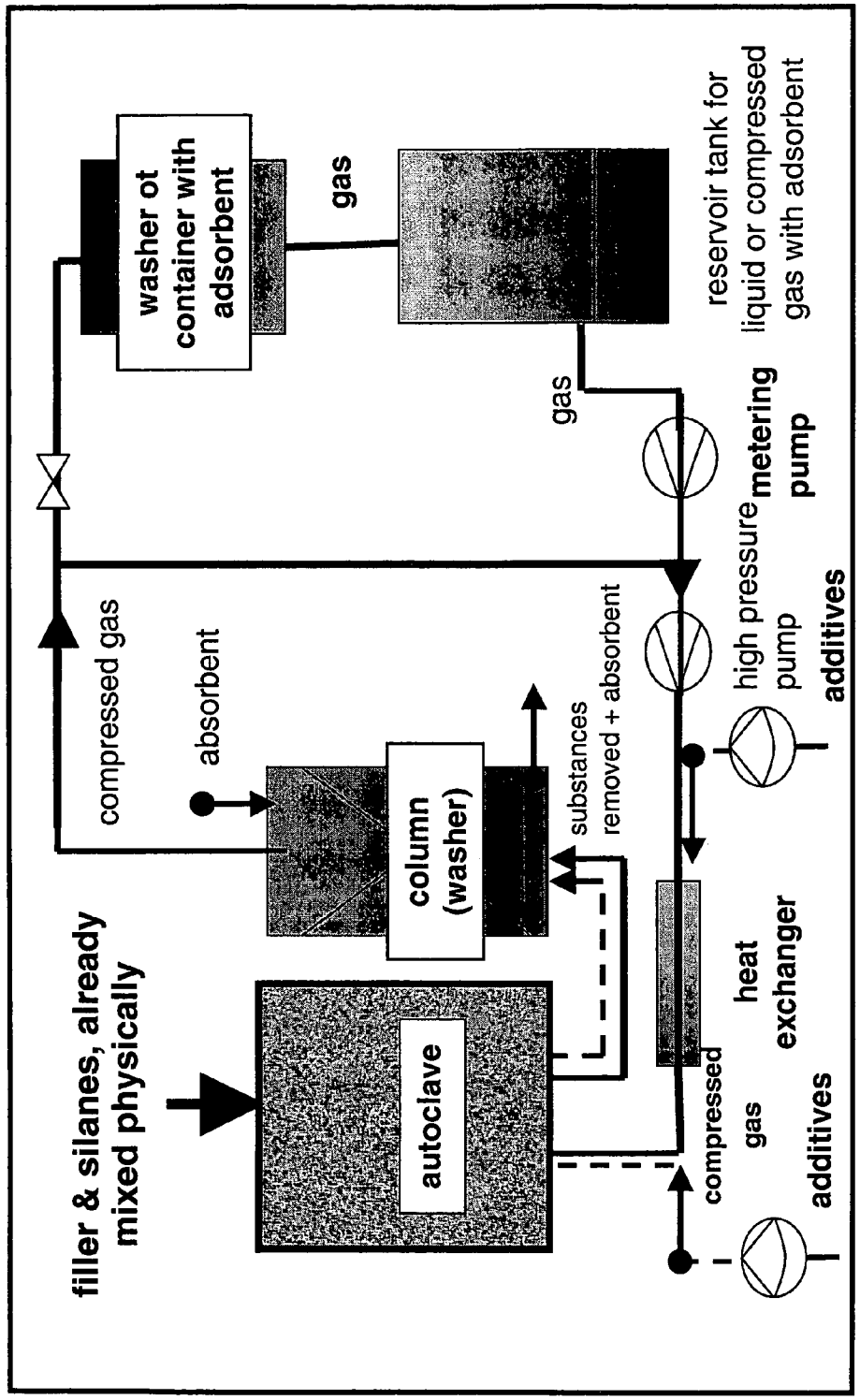
Figure 8:
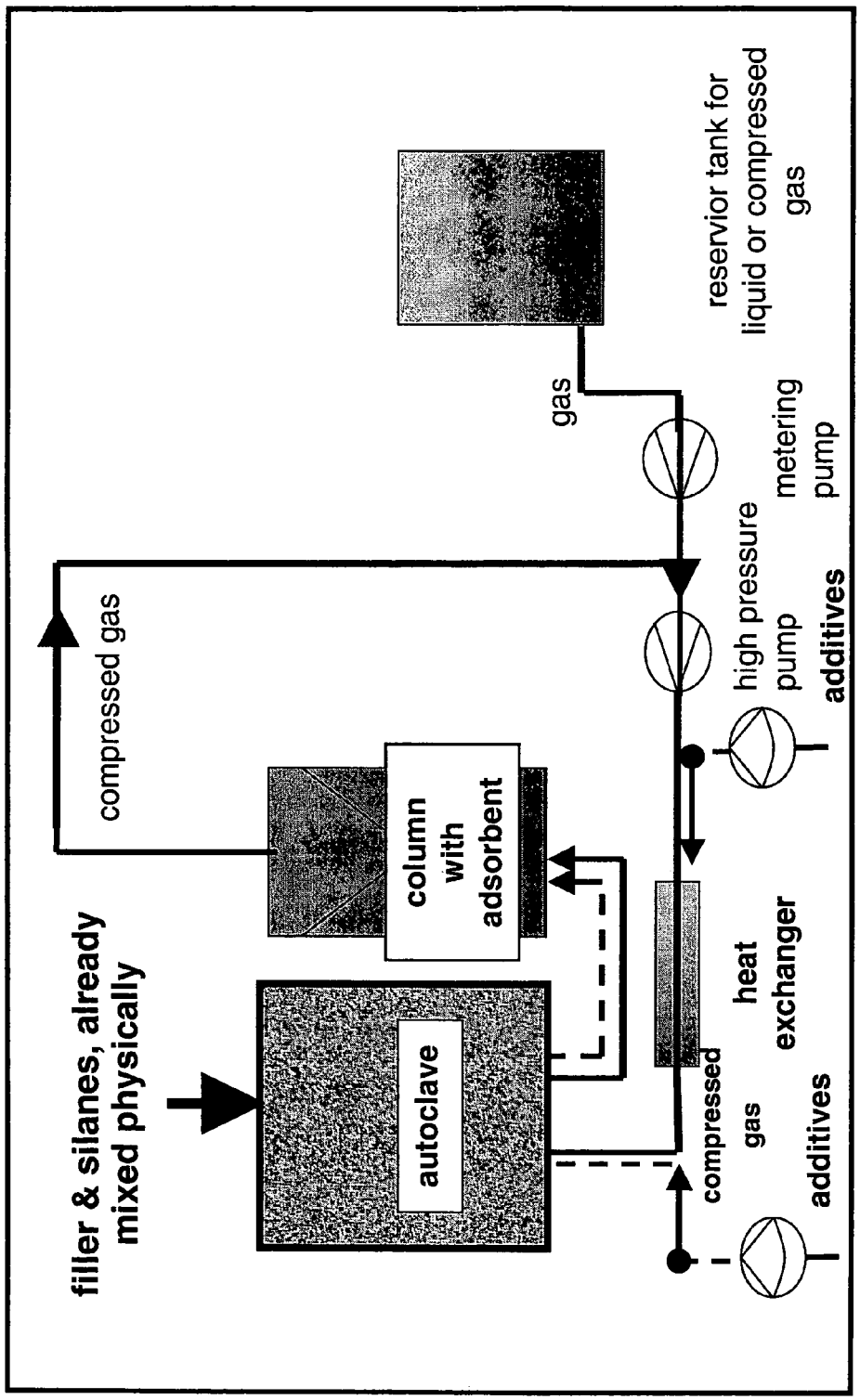
Figure 9:
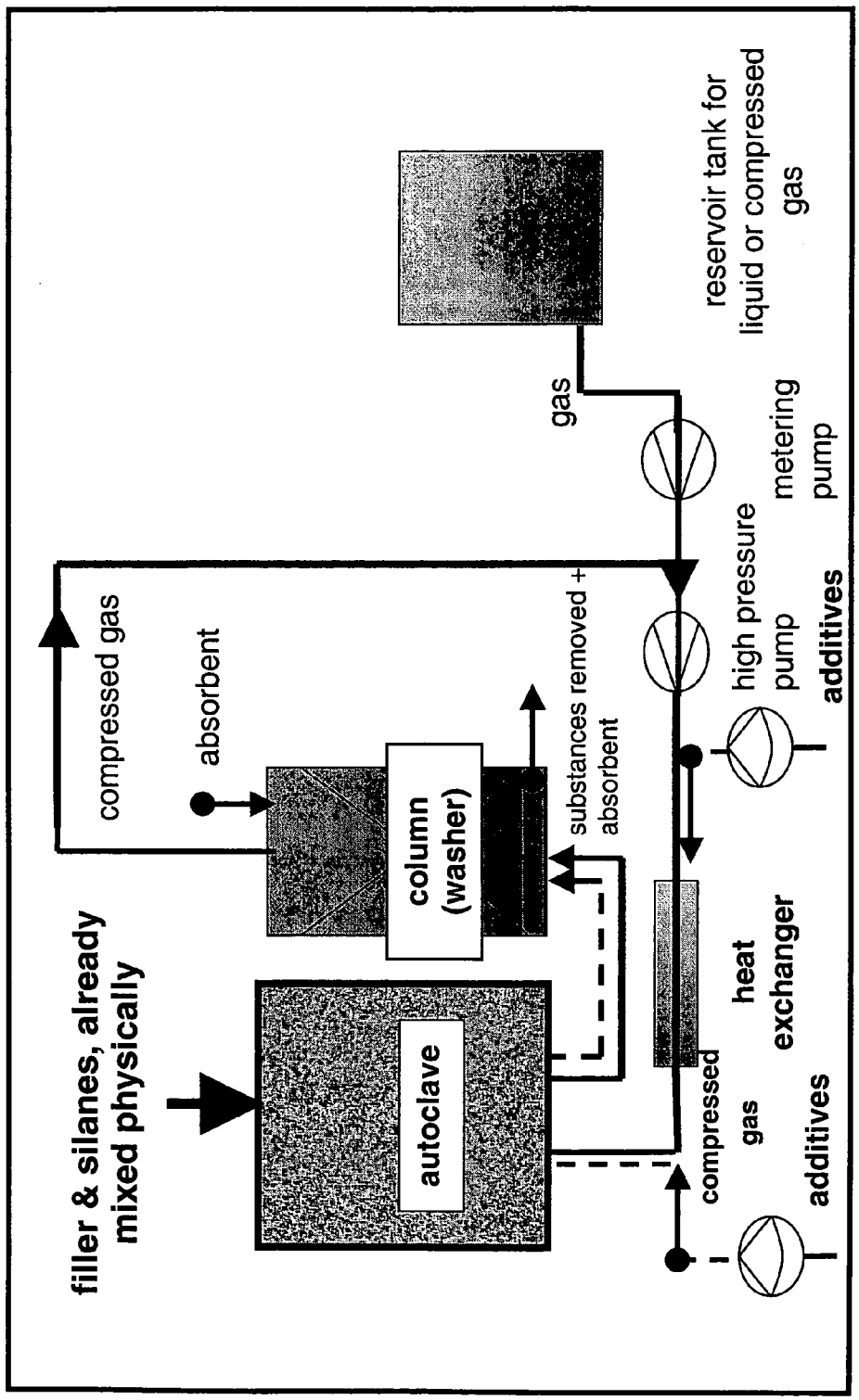
Figure 10:
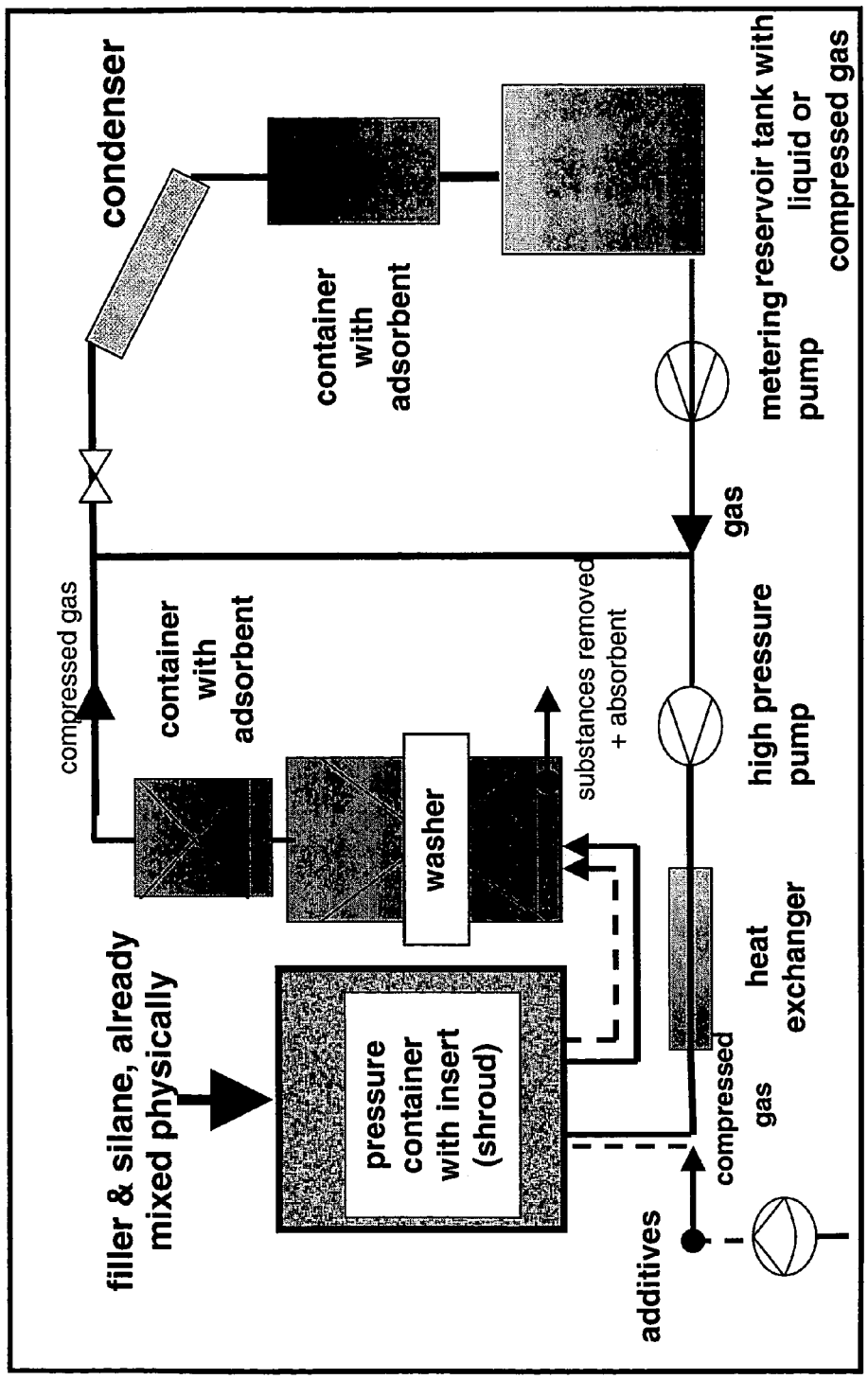
Figure 11:
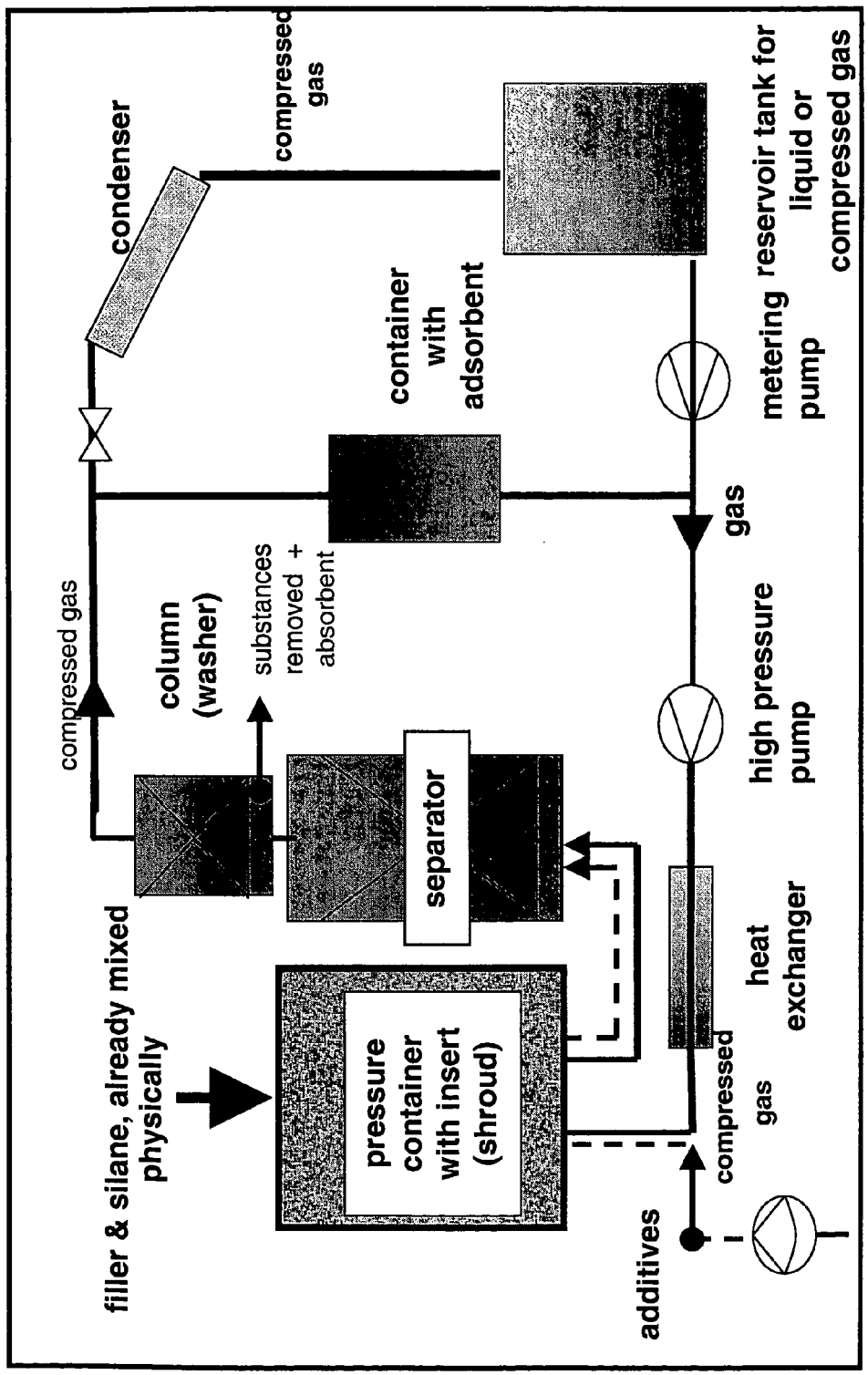

After extraction, the compressed gas can be passed, for example, in counter-current to a liquid serving as a sorbent through a pressure container modified with packing or other devices. Preferably, the compressed gas is introduced from the bottom and the liquid in counter-current from the top into a column or a suitably constructed pressure container. The washed gas can be passed out of the pressure tank at the top, while sorbent liquid and extracted substances are drained off from the pressure container at the bottom. The liquid can be removed continuously or discontinuously from the container serving as the washer (FIG. 1-7). As shown in FIG. 4, the wash liquid can be passed at least once through a pressure container functioning as a washer. In addition, the absorption of substances from the compressed gas can be combined with an adsorption of substances from the compressed gas (FIG. 4+5+7).

Additional devices can be employed in the pressure container which is indispensable in the extraction with compressed gases as described above. The first device serves to demarcate the space filled with filler, and at the same time is permeable to gas. A second device may be used to feed in compressed gas. A third device may be used to remove the silane-modified and extracted fillers from the pressure container and can expediently be at the base of the pressure container and/or at the base of the first device.

The invention also provides an apparatus for carrying out the process according to the invention, which comprises at least one pressure container. The pressure container preferably has at least one internal container, sieve or insert for accommodation of the filler. This container, sieve or insert should be permeable to the gas being used for extraction. The pressure container should also have at least one inlet for feeding gas to the bulk bed of filler, and at least one outlet for removing gas from the bulk bed of filler (see e.g., FIGS. 12-19). The pressure container should be designed to allow gas to flow either radially from the inside outwards (see e.g., FIG. 12-14) or radially from the outside inwards (see e.g., FIGS. 15-18).

The container, sieve or insert described above may be referred to as a "sieve" or "shroud". The shroud can comprise a perforated metal sheet or slotted screen, a porous substance which is permeable to fluid, a woven fabric which is permeable to fluid, a membrane which is permeable to fluid, a polymer which is permeable to fluid or a suitable mechanical arrangement, such as slotted screens, baffles or the like. The shroud can be inserted or fixed in the outer pressure container, for example, it can be anchored, supported or suspended in this container.

In the centre of the first device (i.e., the shroud, or sieve), and therefore also in the centre of the pressure container, there may be a second device, this one designed for feeding gas into the container (see FIGS. 14-19). This device should be coaxial with the pressure container and can comprise, for example, a hollow pipe ("central pipe") or the like, one end of which is closed, but with an outer wall or jacket that is permeable to compressed gases. The second device can be suitably inserted or fixed in the outer pressure container or the first device, for example, it can be anchored, supported, screwed, welded or suspended. The gas feed into the second device (for example the axial central tube) can be either from the top or from the bottom.

The third device can be at the base of the first device or at the base of the pressure autoclave. It can serve for discharging the extracted silane-modified fillers after the extraction process. This can take place either mechanically, by increased pressure or by reduced pressure. The fillers can be conveyed into a pressure-resistant intermediate container by increased pressure (conveying by pressure) or they can be sucked into a vacuum-resistant intermediate container by reduced pressure (conveying by suction).

The filler is positioned in the intermediate space ("annular space") between the first and second device (for example shroud and central pipe) via openings in the pressure container. Filling from the top, for example via openings in the cover of the pressure container, is generally preferred.

FIGS. 8-11 are variants and combinations of the construction of high pressure extraction installations in which the process according to the invention can be carried out. The compressed gas can be fed into the centrally arranged, axial central pipe of the pressure container and then emerge through openings, pores or the like radially into the bulk material, from where it flows outwards. The internal wall, adjacent to the filler, of the shroud in the pressure vessel should be capable of allowing the compressed gas to pass and at the same time of retaining the fillers (FIG. 12-18). To accomplish this, the material can be provided with appropriately dimensioned devices which are suitable for this purpose, such as holes, slits, micropores, macropores, perforations, baffles or the like.

The process can be employed with or without continuous or discontinuous stirring or a circulating device for the silane/filler mixture during the extraction of the substances from the modified filler. A stirring or circulating device can be, for example, a piston stirrer, blade stirrer, beam stirrer, perforated beam stirrer, cross-beam stirrer, anchor stirrer, grating stirrer, paddle mill, propeller stirrer, screw stirrer, turbine stirrer, disc stirrer, planetary stirrer or impeller stirrer.

The compressed gas can flow through the bulk material radially, can be fed to the bulk material radially or can leave in the radial direction. To achieve a satisfactory extraction rate of substances from the silane-modified filler, it is not essential whether the compressed gas flows through the filler radially from the inside outwards or radially from the outside inwards.

Figure 12:
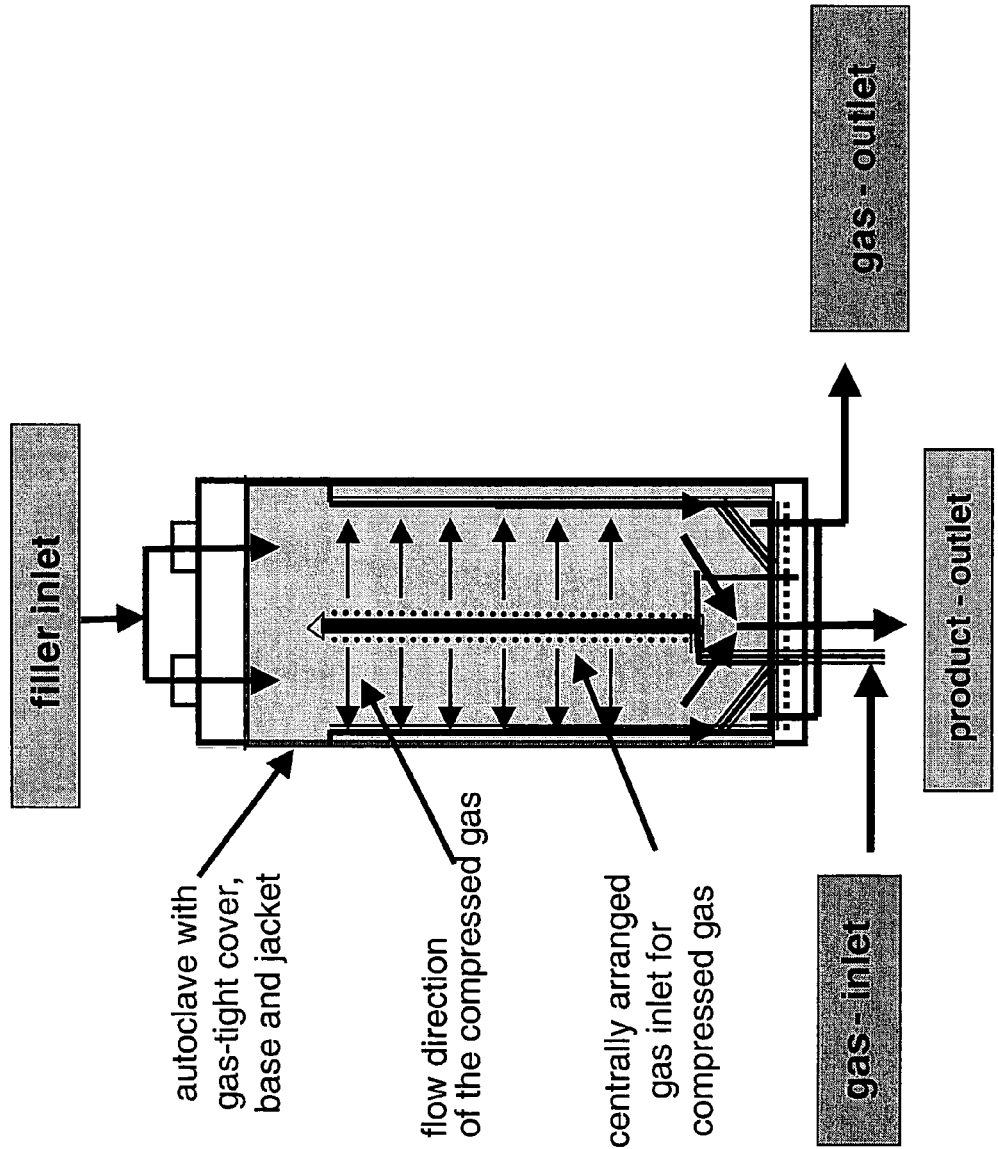
FIGS. 12-19 show various arrangements of the pressure container used in extracting silane-modified oxidic or silicatic fillers according to the present invention.
Figure 13:
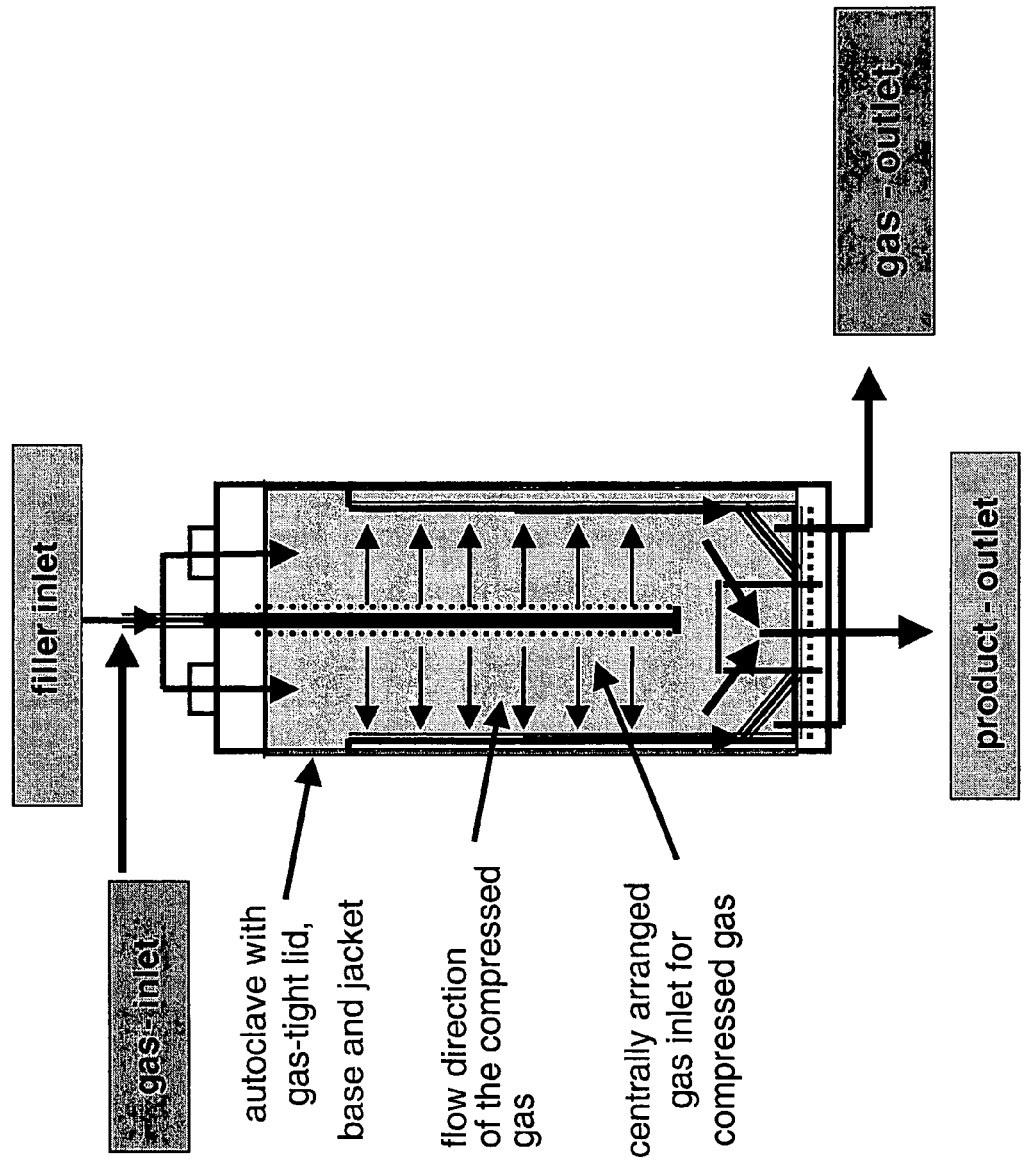
Figure 14:
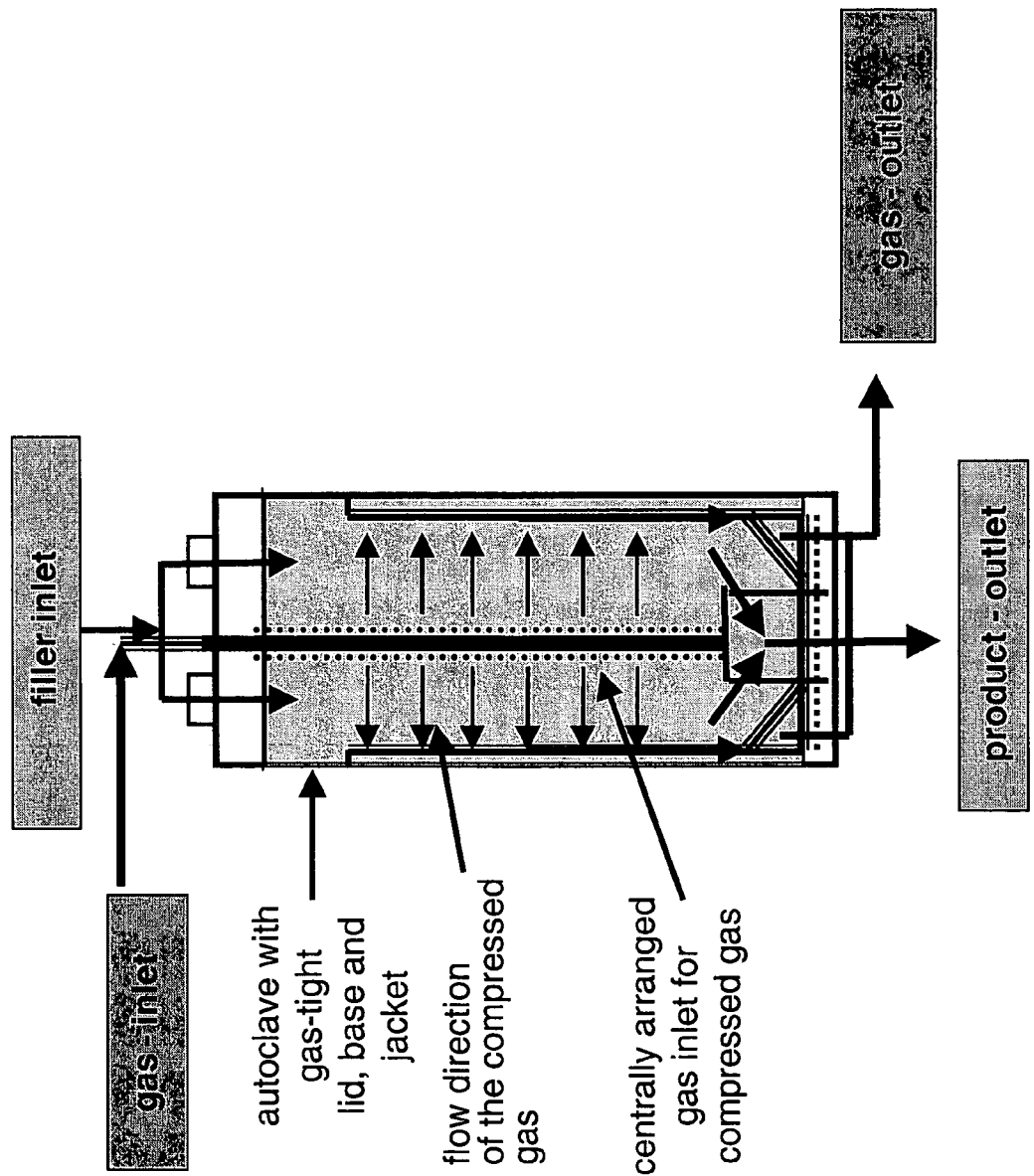
Figure 15:
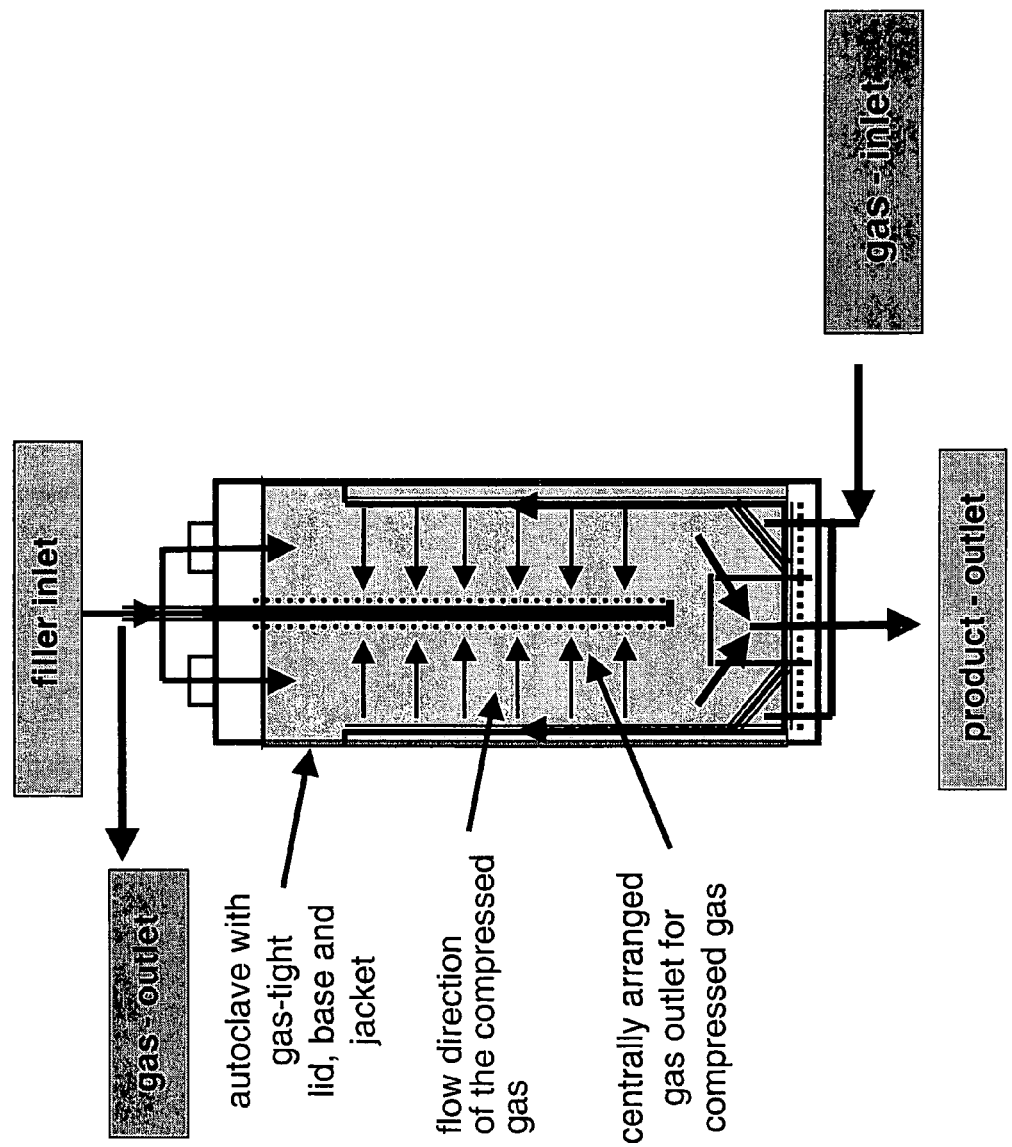
Figure 16:
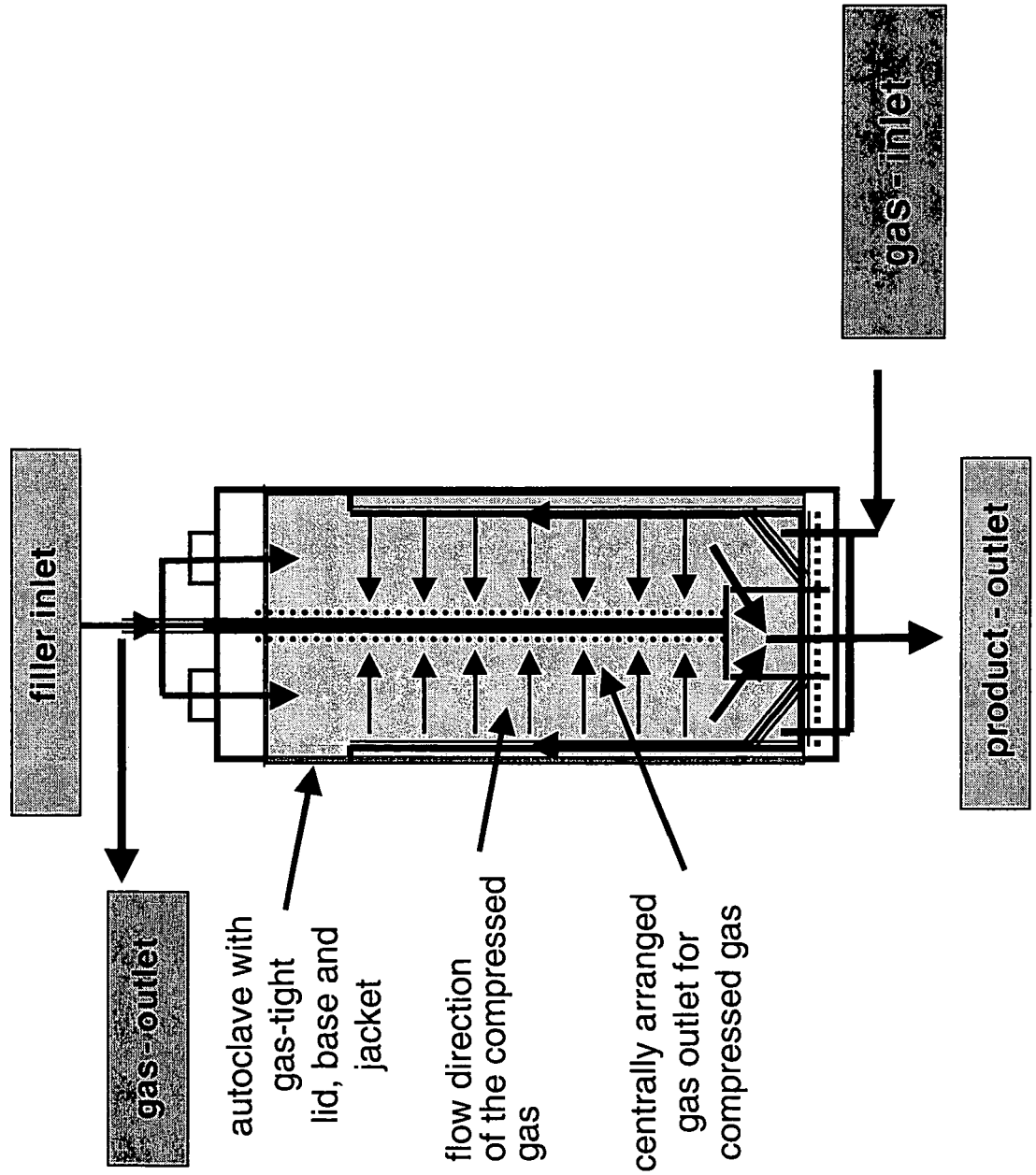
Figure 17:
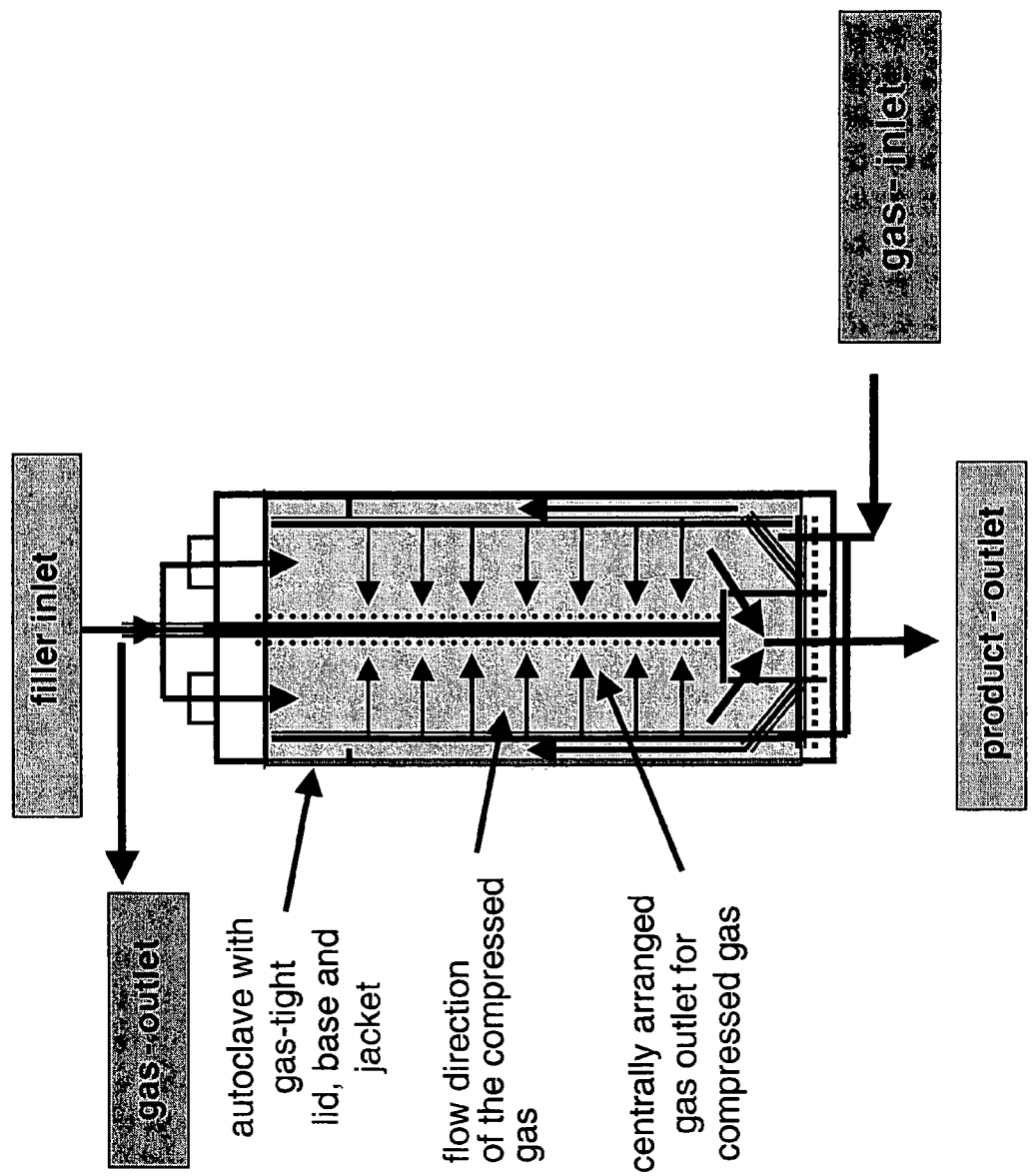
Figure 18:
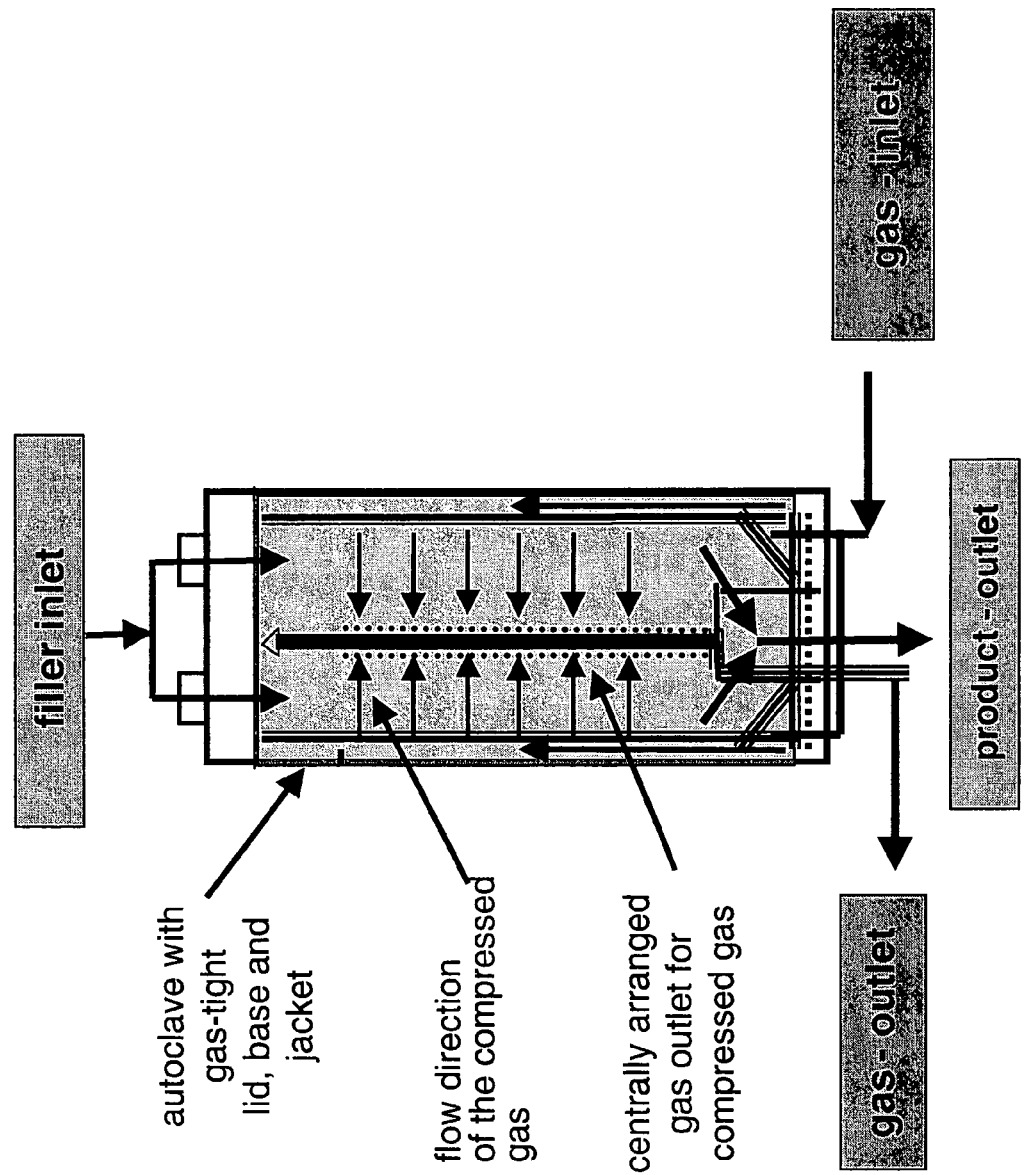
Figure 19:
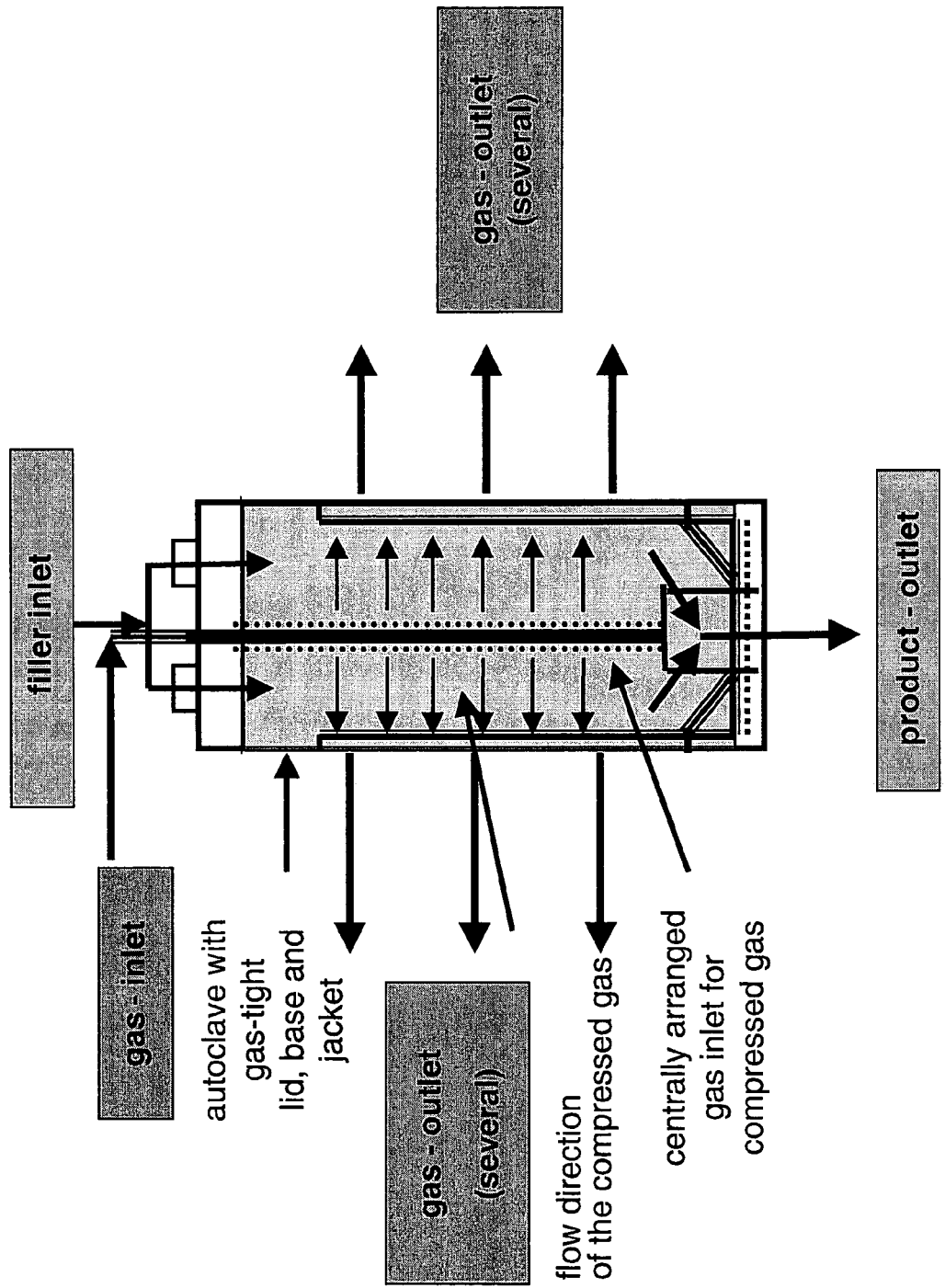

In a radial procedure, it may prove to be favourable in large scale operations for the flow direction of gas to be from the inside outwards (FIG. 12-14+19). A slight drifting of the filler particles to the outside may be observed, so that a free and protective space forms around the central pipe. Compaction of fillers on the inner edge of the shroud may be possible, but is not observed.

Feeding gas from the outside inwards (FIG. 15-18) may theoretically also sometimes have advantages. Simple discharge of the silane-modified fillers from the pressure container, for example by suction upwards or downwards, when the extraction has ended may be promoted by this means.

FIG. 12 shows a variant according to the invention in which compressed gas is fed into the pressure container from the bottom. This arrangement has the advantage, for example, that the central gas inlet pipe can be firmly and permanently anchored mechanically at the base. The figure indicates that the length of the central pipe in this embodiment of the invention should be co-ordinated with the level of fill of the filler and the height of the shroud of gas-permeable construction.

FIG. 13 shows a variant of the invention in which compressed gas is fed into the pressure container from the top. This arrangement has the advantage, for example, that there are increased degrees of freedom in the installation of discharge aids for the modified filler at the base of the first device and of the pressure autoclave.

FIG. 14 shows another variant of the invention in which compressed gas is fed into the pressure container from the top. The mechanical stress on the central pipe due to lateral deflection forces presents fewer problems compared with the embodiment according to the invention in FIG. 12, since the central pipe is fixed or secured at the bottom and top.

The technical implementation of the invention can take place in various forms and manners and can vary in technical, material or process technology details. The process can be carried out in at least one pressure autoclave or in at least two pressure containers connected in series or parallel.

The silane-modified oxidic or silicatic filler can be obtained by reacting at least one oxidic or silicatic filler with at least one silane in a gas compressed by means of pressure and/or temperature. It can also be obtainable by reacting at least one microbeaded, granulated or pulverulent oxidic or silicatic filler with at least one silane in a compressed gas.

Alkoxysilanes can be employed as the silane. Organically modified alkoxysilanes, partly hydrolysed, organically modified alkoxysilanes, completely hydrolysed, organically modified alkoxysilanes or mixtures thereof can all be used.

The silane-modified, oxidic or silicatic filler can have a content of physically and chemically bonded substances of between 0 and 50 wt. %, preferably between 0 and 30 wt. %, particularly preferably between 0 and 15 wt. %. It can contain as physically and chemically bonded substances, for example, organically modified alkoxysilanes, partly hydrolysed, organically modified alkoxysilanes, completely hydrolysed, organically modified alkoxysilanes, alcohols, amines, water, elemental sulfur, carboxylic acids, silicone oligomers or silicone oils or alkali metal sulfates.

After extraction, the silane-modified, oxidic or silicatic filler should have a chemically or physically bonded residual content of the alcohol originating from the alkoxysilane of less than 100 mol %, preferably less than 75 mol %, particularly preferably less than 30 mol %, especially preferably less than 15 mol % of the alcohol which is contained in the silane and can be liberated by hydrolysis.

The silane-modified oxidic or silicatic filler can contain 0.1 to 50 wt. %, preferably 0.1 to 25.0 wt. %, particularly preferably 0.1 to 15 wt. % of silane. The silane can be bonded chemically and/or physically to the surface of the fillers.

The silane compound can be an organosilicon compound or mixture of organosilicon compounds of the general formula (I)

$$Z\text{-}A\text{-}S_x\text{-}A\text{-}Z \qquad (I)$$

in which x is a number from 1 to 14, preferably 1 to 8, particularly preferably 2 to 6, Z is $SiX^1X^2X^3$ and $X^1$, $X^2$, $X^3$ in each case independently of one another can denote hydrogen (—H), halogen (—Cl, —Br, —I) or hydroxyl (—OH), a linear, branched or cyclic hydrocarbon chain having 1-18 carbon atoms (C1-C18), preferably having C1-C10, preferably methyl, ethyl, propyl or butyl, an alkyl acid $(C_xH_{2x+1})$—C(=O)O— or alkenyl acid substituent, for example acetoxy $CH_3$—(C=O)O—, a substituted alkyl or alkenyl acid substituent, for example oximato $R'_2C$=NO—, a cycloalkane radical having 5-12 carbon atoms, a benzyl radical or a halogen- or alkyl-substituted phenyl radical, alkoxy groups, preferably $(C_1\text{-}C_{24})$ alkoxy, having linear or branched hydrocarbon chains, methoxy $(CH_3O—)$, ethoxy $(C_2H_5O—)$, propoxy $(C_3H_7O—)$ or butoxy $(C_4H_9O—)$ and dodecyloxy $(C_{12}H_{25}O—)$, tetradecyloxy $(C_{14}H_{29}O—)$, hexadecyloxy $(C_{16}H_{33}O—)$ and octadecyloxy $(C_{18}H_{37}O—)$ being particularly preferred, alkoxy groups having linear or branched polyether chains having $C_1\text{-}C_{50}$ atoms, for example of the form —O—$(CH_2$—$CH_2$—O—$)_z$-alkyl, —O—$(C(CH_3)H$—$CH_2$—

O—)$_z$-alkyl or —O—(CH$_2$—C(CH$_3$)H—O—)$_z$-alkyl where z=1-15, preferably z=1-10, more preferably z=2-8, and alkyl=C1-C30, preferably C1-C20, particularly preferably C8-C18, branched and/or unbranched, a cycloalkoxy group having (C$_{5-12}$) atoms, a halogen- or alkyl-substituted phenoxy group or a benzyloxy group, A is a linear or branched, saturated or unsaturated aliphatic, aromatic or mixed aliphatic/aromatic divalent C$_1$-C$_{30}$, preferably C$_1$-C$_3$ hydrocarbon chain, preferably C$_1$-C$_3$, particularly preferably (—CH$_2$—), (—CH$_2$—)$_2$, (—CH$_2$—)$_3$, (—CH(CH$_3$)—CH$_2$—) or (—CH$_2$—CH(CH$_3$)—).

"A" can be linear or branched and contain saturated and also unsaturated bonds. A can be provided with diverse substituents instead of with hydrogen substituents, such as, for example, —CN, halogens, for example —Cl, —Br or —F, alcohol functionalities —OH, alkoxides —OR' or —O—(C=O)—R' (R'=alkyl, aryl). A can preferably be CH$_2$, CH$_2$CH$_2$, CH$_2$CH$_2$CH$_2$, CH$_2$CH(CH$_3$), CH$_2$CH$_2$CH$_2$CH$_2$, CH$_2$CH$_2$CH(CH$_3$), CH$_2$CH(CH$_3$)CH$_2$, CH$_2$CH$_2$CH$_2$CH$_2$CH$_2$, CH$_2$CH(CH$_3$)CH$_2$CH$_2$, CH$_2$CH$_2$CH(CH$_3$)CH$_2$, CH(CH$_3$)CH$_2$CH(CH$_3$) or CH$_2$CH(CH$_3$)CH(CH$_3$).

The following compounds, for example, can be used as the silane of the general formula (I):

[(MeO)$_3$Si(CH$_2$)$_3$]$_2$S, [(MeO)$_3$Si(CH$_2$)$_3$]$_2$S$_2$, [(MeO)$_3$Si(CH$_2$)$_3$]$_2$S$_3$, [(MeO)$_3$Si(CH$_2$)$_3$]$_2$S$_4$, [(MeO)$_3$Si(CH$_2$)$_3$]$_2$S$_5$, [(MeO)$_3$Si(CH$_2$)$_3$]$_2$S$_6$, [(MeO)$_3$Si(CH$_2$)$_3$]$_2$S$_7$, [(MeO)$_3$Si(CH$_2$)$_3$]$_2$S$_8$, [(MeO)$_3$Si(CH$_2$)$_3$]$_2$S$_9$, [(MeO)$_3$Si(CH$_2$)$_3$]$_2$S$_{10}$, [(MeO)$_3$Si(CH$_2$)$_3$]$_2$S$_{11}$, [(MeO)$_3$Si(CH$_2$)$_3$]$_2$S$_{12}$, [(EtO)$_3$Si(CH$_2$)$_3$]$_2$S, [(EtO)$_3$Si(CH$_2$)$_3$]$_2$S$_2$, [(EtO)$_3$Si(CH$_2$)$_3$]$_2$S$_3$, [(EtO)$_3$Si(CH$_2$)$_3$]$_2$S$_4$, [(EtO)$_3$Si(CH$_2$)$_3$]$_2$S$_5$, [(EtO)$_3$Si(CH$_2$)$_3$]$_2$S$_6$, [(EtO)$_3$Si(CH$_2$)$_3$]$_2$S$_7$, [(EtO)$_3$Si(CH$_2$)$_3$]$_2$S$_8$, [(EtO)$_3$Si(CH$_2$)$_3$]$_2$S$_9$, [(EtO)$_3$Si(CH$_2$)$_3$]$_2$S$_{10}$, [(EtO)$_3$Si(CH$_2$)$_3$]$_2$S$_{11}$, [(EtO)$_3$Si(CH$_2$)$_3$]$_2$S$_{12}$, [(EtO)$_3$Si(CH$_2$)$_3$]$_2$S$_{13}$, [(EtO)$_3$Si(CH$_2$)$_3$]$_2$S$_{14}$, [(C$_3$H$_7$O)$_3$Si(CH$_2$)$_3$]$_2$S, [(C$_3$H$_7$O)$_3$Si(CH$_2$)$_3$]$_2$S$_2$, [(C$_3$H$_7$O)$_3$Si(CH$_2$)$_3$]$_2$S$_3$, [(C$_3$H$_7$O)$_3$Si(CH$_2$)$_3$]$_2$S$_4$, [(C$_3$H$_7$O)$_3$Si(CH$_2$)$_3$]$_2$S$_5$, [(C$_3$H$_7$O)$_3$Si(CH$_2$)$_3$]$_2$S$_6$, [(C$_3$H$_7$O)$_3$Si(CH$_2$)$_3$]$_2$S$_7$, [(C$_3$H$_7$O)$_3$Si(CH$_2$)$_3$]$_2$S$_8$, [(C$_3$H$_7$O)$_3$Si(CH$_2$)$_3$]$_2$S$_9$, [(C$_3$H$_7$O)$_3$Si(CH$_2$)$_3$]$_2$S$_{10}$, [(C$_3$H$_7$O)$_3$Si(CH$_2$)$_3$]$_2$S$_{11}$, [(C$_3$H$_{70}$)$_3$Si(CH$_2$)$_3$]$_2$S$_{12}$, [(C$_3$H$_7$O)$_3$Si(CH$_2$)$_3$]$_2$S$_{13}$, [(C$_3$H$_7$O)$_3$Si(CH$_2$)$_3$]$_2$S$_{14}$, [(C$_{12}$H$_{25}$O)(EtO)$_2$Si(CH$_2$)$_3$]Si$_x$[(CH$_2$)$_3$Si(OEt)$_3$], [(C$_{12}$H$_{25}$O)$_2$(EtO)Si(CH$_2$)$_3$]S$_x$[(CH$_2$)$_3$Si(OEt)$_3$], [(C$_{12}$H$_{25}$O)$_3$Si(CH$_2$)$_3$]S$_x$[(CH$_2$)$_3$Si (OEt)$_3$], [(C$_{12}$H$_{25}$O)(EtO)$_2$Si(CH$_2$)$_3$]S$_x$[(CH$_2$)$_3$Si (C$_{12}$H$_{25}$O)(OEt)$_2$], [(C$_{12}$H$_{25}$O)$_2$(EtO)Si(CH$_2$)$_3$]S$_x$[(CH$_2$)$_3$Si(C$_{12}$H$_{25}$O)(OEt)$_2$], [(C$_{12}$H$_{25}$O)$_3$Si(CH$_2$) 3]S$_x$[(CH$_2$)$_3$Si(C$_{12}$H$_{25}$O)(OEt)$_2$], [(C$_{12}$H$_{25}$O)(EtO)$_2$Si(CH$_2$)$_3$]S$_x$[(CH$_2$)$_3$Si(C$_{12}$H$_{25}$O)$_2$(OEt)], [(C$_{12}$H$_{25}$O)$_2$(EtO)Si(CH$_2$)$_3$]S$_x$[(CH$_2$)$_3$ Si(C$_{12}$H$_{25}$O)$_2$(OEt)], [(C$_{12}$H$_{25}$O)$_3$Si(CH$_2$)$_3$]S[(CH$_2$)$_3$Si(C$_{12}$H$_{25}$O)$_2$(OEt)], [(C$_{12}$H$_{25}$O)(EtO)$_2$Si(CH$_2$)$_3$]S[(CH$_2$)$_3$ Si(C$_{12}$H$_{25}$O)$_3$], [(C$_{12}$H$_{25}$O)$_2$(EtO)Si(CH$_2$)$_3$]S$_x$[(CH$_2$)$_3$Si(C$_{12}$H$_{25}$O)$_3$], [(C$_{12}$H$_{25}$O)$_3$Si(CH$_2$)$_3$]S[(CH$_2$)$_3$Si(C$_{12}$H$_{25}$O)$_3$], [(C$_{14}$H$_{29}$O)(EtO)$_2$Si(CH$_2$)$_3$]S$_x$[(CH$_2$)$_3$Si (OEt)$_3$], [(C$_{14}$H$_{29}$O)$_2$(EtO)Si(CH$_2$)$_3$]S$_x$[(CH$_2$)$_3$Si(OEt)$_3$], [(C$_{14}$H$_{29}$O)$_3$Si(CH$_2$)$_3$]S$_x$[(CH$_2$)$_3$Si (OEt)$_3$], [(C$_{14}$H$_{29}$O) (EtO)$_2$Si(CH$_2$)$_3$]S[(CH$_2$)$_3$Si (C$_{14}$H$_{29}$O) (OEt)$_2$], [(C$_{14}$H$_{29}$O)$_2$(EtO)Si(CH$_2$)$_3$]S$_x$ [(CH$_2$)$_3$Si(C$_{14}$H$_{29}$O)(OEt)$_2$], [(C$_{14}$H$_{29}$O)$_3$Si(CH$_2$)$_3$]S$_x$ [(CH$_2$)$_3$Si(C$_{14}$H$_{29}$O)(OEt)$_2$], [(C$_{14}$H$_{29}$O) (EtO)$_2$Si (CH$_2$)$_3$]S$_x$[(CH$_2$)$_3$Si(C$_{14}$H$_{29}$O)$_2$(OEt)], [(C$_{14}$H$_{29}$O)$_2$ (EtO)Si(CH$_2$)$_3$]S$_x$[(CH$_2$)$_3$Si(C$_{14}$H$_{29}$O)$_2$(OEt)], [(C$_{14}$H$_{29}$O)$_3$Si(CH$_2$)$_3$]S$_x$[(CH$_2$)$_3$Si(C$_{14}$H$_{29}$O)$_2$(OEt)], [(C$_{14}$H$_{29}$O)(EtO)$_2$Si(CH$_2$)$_3$]S$_x$[(CH$_2$)$_3$Si(C$_{14}$H$_{29}$O)$_3$], [(C$_{14}$H$_{29}$O)$_2$(EtO)Si(CH$_2$)$_3$]S$_x$[(CH$_2$)$_3$Si(C$_{14}$H$_{29}$O)$_3$], [(C$_{14}$H$_{29}$O)$_3$Si(CH$_2$)$_3$]S$_x$[(CH$_2$)$_3$Si (C$_{14}$H$_{29}$O)$_3$], [(C$_{16}$H$_{33}$O)(EtO)$_2$Si(CH$_2$)$_3$]S$_x$[(CH$_2$)$_3$Si(OEt)$_3$], [(C$_{16}$H$_{33}$O)$_2$(EtO)Si(CH$_2$)$_3$]S$_x$[(CH$_2$)$_3$Si(OEt)$_3$], [(C$_{16}$H$_{33}$O)$_3$Si(CH$_2$)$_3$]S$_x$[(CH$_2$)$_3$Si(OEt)$_3$], [(C$_{16}$H$_{33}$O)(EtO)$_2$Si(CH$_2$)$_3$]S$_x$[(CH$_2$)$_3$Si(C$_{16}$H$_{33}$O)(OEt)$_2$], [(C$_{16}$H$_{33}$O)$_2$(EtO)Si(CH$_2$)$_3$]S$_x$[(CH$_2$)$_3$Si(C$_{16}$H$_{33}$O)(OEt)$_2$], [(C$_{16}$H$_{33}$O)$_3$Si(CH$_2$)$_3$]S$_x$[(CH$_2$)$_3$Si(C$_{16}$H$_{33}$O)(OEt)$_2$], [(C$_{16}$H$_{33}$O)(EtO)$_2$Si(CH$_2$)$_3$]S$_x$[(CH$_2$)$_3$Si (C$_{16}$H$_{33}$O)$_2$(OEt)], [(C$_{16}$H$_{33}$O)$_2$(EtO)Si(CH$_2$)$_3$]S$_x$ [(CH$_2$)$_3$Si(C$_{16}$H$_{33}$O)$_2$(OEt)], [(C$_{16}$H$_{33}$O)$_3$Si(CH$_2$)$_3$]S$_x$ [(CH$_2$)$_3$Si(C$_{16}$H$_{33}$O)$_2$(OEt)], [(C$_{16}$H$_{33}$O)(EtO)$_2$Si (CH$_2$)$_3$]S$_x$[(CH$_2$)$_3$Si(C$_{16}$H$_{33}$O)$_3$], [(C$_{16}$H$_{33}$O)$_2$(EtO)Si (CH$_2$)$_3$]S$_x$[(CH$_2$)$_3$Si(C$_{16}$H$_{33}$O)$_3$], [(C$_{16}$H$_{33}$O)$_3$Si(CH$_2$)$_3$]S$_x$[(CH$_2$)$_3$Si(C$_{16}$H$_{33}$O)$_3$], [(C$_{18}$H$_{37}$O)(EtO)$_2$Si(CH$_2$)$_3$]S$_x$[(CH$_2$)$_3$Si(OEt)$_3$], [(C$_{18}$H$_{37}$O)$_2$(EtO)Si(CH$_2$)$_3$]S$_x$[(CH$_2$)$_3$Si(OEt)$_3$], [(C$_{18}$H$_{37}$O)$_3$Si(CH$_2$)$_3$]S$_x$[(CH$_2$)$_3$Si (OEt)$_3$], [(C$_{18}$H$_{37}$O)(EtO)$_2$Si(CH$_2$)$_3$]S$_x$[(CH$_2$)$_3$Si (C$_{18}$H$_{37}$O)(OEt)$_2$], [(C$_{18}$H$_{37}$O)$_2$(EtO)Si(CH$_2$)$_3$]S$_x$ [(CH$_2$)$_3$Si(C$_{18}$H$_{37}$O)(OEt)$_2$], [(C$_{18}$H$_{37}$O)$_3$Si(CH$_2$)$_3$]S$_x$ [(CH$_2$)$_3$Si(C$_{18}$H$_{37}$O)(OEt)$_2$], [(C$_{18}$H$_{37}$O)(EtO)$_2$Si (CH$_2$)$_3$]S$_x$[(CH$_2$)$_3$Si(C$_{18}$H$_{37}$O)$_2$(OEt)], [(C$_{18}$H$_{37}$O)$_2$ (EtO)Si(CH$_2$)$_3$]S$_x$[(CH$_2$)$_3$Si(C$_{18}$H$_{37}$O)$_2$(OEt)], [(C$_{18}$H$_{37}$O)$_3$Si(CH$_2$)$_3$]S$_x$[(CH$_2$)$_3$Si(C$_{18}$H$_{37}$O)$_2$(OEt)], [(C$_{18}$H$_{37}$O)(EtO)$_2$Si(CH$_2$)$_3$]S$_x$[(CH$_2$)$_3$Si(C$_{18}$H$_{37}$O)$_3$], [(C$_{18}$H$_{37}$O)$_2$(EtO)Si(CH$_2$)$_3$]S$_x$[(CH$_2$)$_3$Si(C$_{18}$H$_{37}$O)$_3$] or [(C$_{18}$H$_{37}$O)$_3$Si(CH$_2$)$_3$]S$_x$[(CH$_2$)$_3$Si(C$_{18}$H$_{37}$O)$_3$]

The compounds described in DE 10122269.6 can also be used as the silane of the formula I.

The silane may also be an organosilicon compound or mixture of organosilicon compounds of the general formula (II)

$$X^1X^2X^3Si\text{-}A\text{-}S\text{—}SiR^1R^2R^3 \quad (II)$$

in which

X$^1$, X$^2$, X$^3$ and A independently of one another have the same meaning as in formula (I), R$^1$, R$^2$ and R$^3$ are in each case independent of one another and denote (C$_1$-C$_{16}$) alkyl, preferably (C$_1$-C$_4$) alkyl, particularly preferably methyl and ethyl, (C$_1$-C$_{16}$) alkoxy, preferably (C$_1$-C$_4$) alkoxy, particularly preferably methoxy and ethoxy, (C$_1$-C$_{16}$) haloalkyl, aryl, (C$_7$-C$_{16}$) aralkyl, —H, halogen or X$^1$X$^2$X$^3$Si-A-S—.

The following compounds, for example, can be used as the silane of the general formula (II):

(EtO)$_3$-Si—(CH$_2$)$_3$—S—Si(CH$_3$)$_3$, [(EtO)$_3$-Si—(CH$_2$)$_3$—S]$_2$Si(CH$_3$)$_2$, [(EtO)$_3$-Si—(CH$_2$)$_3$—S]$_3$Si(CH$_3$), [(EtO)$_3$-Si—(CH$_2$)$_3$—S]$_2$Si(OEt)$_2$, [(EtO)$_3$-Si—(CH$_2$)$_3$—S]$_4$Si, (EtO)$_3$-Si—(CH$_2$)$_3$—S—Si(OEt)$_3$, (MeO)$_3$-Si—(CH$_2$)$_3$—S—Si(C$_2$H$_5$)$_3$, [(MeO)$_3$-Si—(CH$_2$)$_3$—S]$_2$Si(C$_2$H$_5$)$_2$, [(MeO)$_3$-Si—(CH$_2$)$_3$—S]$_3$Si(CH$_3$), [MeO)$_3$-Si—(CH$_2$)$_3$—S]$_2$Si(OMe)$_2$, [(MeO)$_3$-Si—(CH$_2$)$_3$—S]$_4$Si, (MeO)$_3$-Si—(CH$_2$)$_3$—S—Si(OMe)$_3$, (EtO)$_3$-Si—(CH$_2$)$_2$—CH(CH$_3$)—S—Si(CH$_3$)$_3$, (EtO)$_3$-Si—(CH$_2$)$_2$—CH(CH$_3$)—S—Si(C$_2$H$_5$)$_3$, (EtO)$_3$-Si—(CH$_2$)$_2$—CH(CH$_3$)—S—Si(C$_6$H$_5$)$_3$ or (EtO)$_3$-Si—(CH$_2$)$_2$(p-C$_6$H$_4$)—S—Si(CH$_3$)$_3$.

The silane may also be an organosilicon compound or mixture of organosilicon compounds of the general formula (III)

$$X^1X^2X^3Si\text{-}Alk \quad (III)$$

in which

X$^1$, X$^2$ and X$^3$ in each case independently of one another have the same meaning as in formula (I) and Alk is a straight-chain, branched or cyclic ($C_1$-$C_{18}$) alkyl, for example methyl, ethyl, n-propyl, n-butyl, n-pentyl, n-hexyl, isopropyl or tert-butyl, ($C_1$-$C_5$) alkoxy, for example methoxy, ethoxy, propoxy, butoxy, isobutoxy, t-butoxy or pentoxy, halogen, for example fluorine, chlorine, bromine or iodine, hydroxyl, thiol, nitrile, ($C_1$-$C_4$) haloalkyl, —$NO_2$, ($C_1$-$C_8$) thioalkyl, —$NH_2$, —$NHR^1$, —$NR^1R^2$, $NH(SiX^1X^2X^3)$, alkenyl, allyl, vinyl, aryl or ($C_7$-$C_{16}$) aralkyl.

The vinyl group and straight-chain, branched or cyclic fragments which can contain one or more carbon double bonds can be combined under the term alkenyl.

Both monocyclic and bicyclic or polycyclic structures, as well as cyclic structures which are provided with alkyl substituents, for example norbornyl, norbornenyl, ethylnorbornyl, ethylnorbornenyl, ethylcyclohexyl, ethylcyclohexenyl or cyclohexylcyclohexyl groups, can be combined under the term cyclic alkyl or alkenyl fragments.

Aryl are understood as meaning phenyls, biphenyls or other benzoid compounds, which are optionally substituted by ($C_1$-$C_3$)alkyl, ($C_1$-$C_3$)alkoxy, halogen, hydroxyl or by heteroatoms, such as $NR^1R^2OR^1$, $PR^1R^2R^3$, SH or $SR^1$.

The following compounds, for example, can be used as the silane of the general formula (III):
($C_{12}H_{25}O)_3$—Si—$(CH_2)_{16}$—H, ($C_{14}H_{29}O)_3$—Si—$(CH_2)_{16}$—H, ($C_{16}H_{33}O)_3$—Si—$(CH_2)_{16}$—H, ($C_{18}H_{37}O)_3$—Si—$(CH_2)_{16}$—H, $(EtO)_3$—Si—$(CH_2)_3$—H, $(MeO)_3$—Si—$(CH_2)_3$—H, $(EtO)_3$—Si—$C(CH_3)_3$, $(MeO)_3$—Si—C($CH_3)_3$, $(EtO)_3$—Si—$(CH_2)_8$—H, $(MeO)_3$—Si—$(CH_2)_8$—H, $(EtO)_3$—Si—$(CH_2)_{16}$—H, $(MeO)_3$—Si—$(CH_2)_{16}$—H, $(Me)_3Si$—(OMe), $((Et)_3Si$—(OMe), $(C_3H_7)_3Si$-(OMe), $(C_6H_5)_3Si$-(OMe), $(Me)_3Si$-(OEt), $((Et)_3Si$-(OEt), $(C_3H_7)_3$ Si-(OEt), $(C_6H_5)_3Si$-(OEt), $(Me)_3Si$—$(OC_3H_7)$, $(Et)_3$ Si—$(OC_3H_7)$, $(C_3H_7)_3Si$—$(OC_3H_7)$, $(C_6H_5)_3Si$—$(OC_3H_7)$, $(Me)_3SiCl$, $(Et)_3SiCl$, $(C_3H_7)_3SiCl$, $(C_6H_5)_3SiCl$, $Cl_3$—Si—$CH_2$—CH=$CH_2$,(Meo)$_3$—$_{Si-CH2}$—CH=$CH_2$,(EtO)$_3$—Si—$CH_2$—CH=$_2$,(EtO) $_3$—Si—CH=$CH_2$, $(Me_3Si)_2N$—C(O)—H or $(Me_3Si)_2N$—H.

The silane may also be an organosilicon compound or a mixture of organosilicon compounds of the general formulae (IV) or (V)

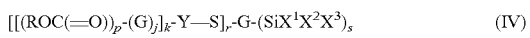  (IV)

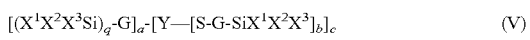  (V)

in which Y represents a polyvalent species $(Q)_zD(=E)$, wherein the following applies:
p is 0 to 5, r is 1 to 3, z is 0 to 2, q is 0 to 6, a is 0 to 7, b is 1 to 3, j is 0 or 1, but if p=1 it can also often be 0, c is 1 to 6, preferably 1 to 4, s is 1 to 3, k is 1 to 2, with the proviso that
(1) if (D) is a carbon, sulfur or sulfonyl, a+b=2 and k=1,
(2) if (D) is a phosphorus atom, a+b=3 as long as c>1 and b=1, where a=c+1,
(3) if (D) is a phosphorus atom, k=2,
Y represents a polyvalent species $(Q)_zD(=E)$, preferably —C(=NR)—, —SC(=NR)—, —SC(=O)—, (—NR)C(=O)—, (—NR)C(=S)—, —OC(=O)—, —OC(=S)—, —C(=O)—, —SC(=S)—, —C(=S)—, —S(=O)—, —S(=O)$_2$—, —OS(=O)$_2$—, (—NR)S(=O)$_2$—, —SS(=O)—, —OS(=O)—, (NR)S(=O)—, —SS(=O)$_2$—, (—S)$_2$P(=O)—, —(—S)P(=O)—, —P(=O)(-)$_2$, (—S)$_2$P(=S)—, —(—S)P(=S)—, —P(=S)(-)$_2$, (—NR)$_2$P(=O)—, (—NR)(—S)P(=O)—, (—O)(—NR)P(=O)—, (—O)(—S)P(=O)—, (—O)$_2$P(=O)—, —(—O)P(=O)—, —(—NR)P(=O)—, (—NR)$_2$P(=S)—, (—NR)(—S)P(=S)—,  (—O)(—NR)P(=S)—, (—O)(—S)P(=S)—, (–O)$_2$P(=S)—, —(—O)P(=S)— or —(—NR)P(=S)—,
in each of these groups the atom (D) forms two bonds with the heteroatom (E), which in turn is bonded to the sulfur atom (S), which is linked to the silicon atom (Si) by means of a group (G),
R independently of one another denote H,
a straight, cyclic or branched alkyl chain, preferably ($C_1$-$C_{18}$) alkyl, particularly preferably ($C_1$-$C_4$)alkyl,
optionally alkyl chains which contain unsaturated contents, such as double bonds (alkenes), triple bonds (alkynes) or also alkylaromatics (aralkyl) or aromatics and which have the same meanings as in formula (II),
G independently of the other substituents denotes hydrogen or a straight, cyclic or branched alkyl chain having ($C_1$-$C_{18}$), where the alkyl chains can optionally contain an unsaturated content, such as double bonds (alkenes), triple bonds (alkynes) or also alkylaromatics (aralkyl) or aromatics, if p=0 in formula (IV), G is preferably hydrogen (H), G does not correspond to the structure of an α,β-unsaturated fragment which is bonded to the Y fragment in a manner such that an α,β-unsaturated thiocarbonyl fragment is formed, $X^1$, $X^2$ and $X^3$ in each case independently of one another have the meaning as in formula (I).

An index p of 0 to 2 is preferred, wherein $X^1$, $X^2$ or $X^3$ is an RO—, for example RC(=O)O—. A fragment where p=0, $X^1$, $X^2$ or $X^3$=ethoxy and where G=alkyl skeleton or substituted alkyl skeleton having $C_3$ to $C_{12}$ is particularly preferred.

In $(Q)_zD(=E)$, Q can be oxygen, sulfur or (—NR—), D can be carbon, sulfur, phosphorus or sulfonyl, E can be oxygen, sulfur or (=$NR^1$).

Preferred examples for the function (—YS—) in the formulae (IV) and (V) are:
thiocarboxylate esters —C(=O)—S—, dithiocarboxylates —C(=S)—S—, thiocarbonate esters —O—C(=O)—S—, dithiocarbonate esters —S—C(=O)—S— and —O—C(=S)—S—, trithiocarbonate esters —S—C(=S)—S—, dithiocarbamate esters —N—C(=S)—S—, thiosulfonate esters —S(=O)$_2$—S—, thiosulfate esters —O—S(=O)$_2$—S—, thiosulfamate esters (—N—)S(=O)$_2$—S—, thiosulfinate esters —C—S(=O)—S—, thiosulfite esters —O—S(=O)—S—, thiosulfimate esters N—S(=O)—S—, thiophosphate esters P(=O) (O—)$_2$ (S—), dithiophosphate esters P(=O) (O—) (S—)$_2$ or P(=S) (O—)$_2$(S—), trithiophosphate esters P(=O) (S—)$_3$ or P(=S) (O—) (S—)$_2$, tetrathiophosphate esters P(=S) (S—)$_3$, thiophosphamate esters —P(=O) (—N—) (S—), dithiophosphamate esters —P(=S)(—N—) (S—, thiophosphoramidate esters (—N—)P(=O)(O—)(S—), dithiophosphoramidate esters (—N—)P(=O) (S—)$_2$ or (—N—)P(=S) (O—) (S—) or trithiophosphoramidate esters (—N—)P(=S)(S—)$_2$.

The following compounds, for example, can be used as the silane of the general formula (IV) or (V):
2-triethoxysilyl-1-ethyl thioacetate,
2-trimethoxysilyl-1-ethyl thioacetate,
2-(methyldimethoxysilyl)-1-ethyl thioacetate,
3-trimethoxysilyl-1-propyl thioacetate, triethoxysilylmethyl thioacetate,
trimethoxysilylmethyl thioacetate,
triisopropoxysilylmethyl thioacetate,
methyldiethoxysilylmethyl thioacetate,
methyldimethoxysilylmethyl thioacetate,
methyldiisopropoxysilylmethyl thioacetate,
dimethylethoxysilylmethyl thioacetate,
dimethylmethoxysilylmethyl thioacetate,
dimethylisopropoxysilylmethyl thioacetate, 2-triisopropoxysilyl-1-ethyl thioacetate,
2-(methyldiethoxysilyl)-1-ethyl thioacetate,
2-(methyldiisopropoxysilyl)-1-ethyl thioacetate,
2-(dimethylethoxysilyl)-1-ethyl thioacetate,
2-(dimethylmethoxysilyl)-1-ethyl thioacetate,
2-(dimethylisopropoxysilyl)-1-ethyl thioacetate,
3-triethoxysilyl-1-propyl thioacetate,
3-triisopropoxysilyl-1-propyl thioacetate,
3-methyldiethoxysilyl-1-propyl thioacetate,
3-methyldimethoxysilyl-1-propyl thioacetate,
3-methyldiisopropoxysilyl-1-propyl thioacetate,
1-(2-triethoxysilyl-1-ethyl)-4-thioacetylcyclohexane,
1-(2-triethoxysilyl-1-ethyl)-3-thioacetylcyclohexane,
2-triethoxysilyl-5-thioacetylnorbornene,
2-triethoxysilyl-4-thioacetylnorbornene,
2-(2-triethoxysilyl-1-ethyl)-5-thioacetylnorbornene,
2-(2-triethoxysilyl-1-ethyl)-4-thioacetylnorbornene,
1-(1-oxo-2-thia-5-triethoxysilylpenyl)benzoic acid,
6-triethoxysilyl-1-hexyl thioacetate,
1-triethoxysilyl-5-hexyl thioacetate,
8-triethoxysilyl-1-octyl thioacetate,
1-triethoxysilyl-7-octyl thioacetate,
6-triethoxysilyl-1-hexyl thioacetate,
1-triethoxysilyl-5-octyl thioacetate,
8-trimethoxysilyl-1-octyl thioacetate,
1-trimethoxysilyl-7-octyl thioacetate,
10-triethoxysilyl-1-decyl thioacetate,
1-triethoxysilyl-9-decyl thioacetate,
1-triethoxysilyl-2-butyl thioacetate,
1-triethoxysilyl-3-butyl thioacetate,
1-triethoxysilyl-3-methyl-2-butyl thioacetate,
1-triethoxysilyl-3-methyl-3-butyl thioacetate,
3-trimethoxysilyl-1-propyl thiooctoate,
3-triethoxysilyl-1-propyl thiopalmitate,
3-triethoxysilyl-1-propyl thiooctoate,
3-triethoxysilyl-1-propyl thiotetradecanoate,
3-triethoxysilyl-1-propyl thiohexadecanoate,
3-triethoxysilyl-1-propyl thiooctadecanoate,
3-triethoxysilyl-1-propyl thiobenzoate,
3-triethoxysilyl-1-propyl thio-2-ethylhexanoate,
3-methyldiacetoxysilyl-1-propyl thioacetate,
3-triacetoxysilyl-1-propyl thioacetate,
2-methyldiacetoxysilyl-1-ethyl thioacetate,
2-triacetoxysilyl-1-ethyl thioacetate,
1-methyldiacetoxysilyl-1-ethyl thioacetate or
1-triacetoxysilyl-1-ethyl thioacetate.

The compounds described in EP0958298 or WO9909036 can also be employed as the silane of the formulae IV and V.

The silane can also be an organosilicon compound or a mixture of organosilicon compounds of the general formula (VI)

$$X^1X^2X^3Si\text{-}A\text{-}Sub \quad (VI)$$

wherein $X^1$, $X^2$, $X^3$ and A, in each case independently of one another, have the meaning according to formula (I) and Sub is —SH,   —NH$_2$,   —NH(A—SiX$^1$X$^2$X$^3$), —N(A—SiX$^1$X$^2$X$^3$)$_2$,   O—C(O)—CMe=CH$_2$,

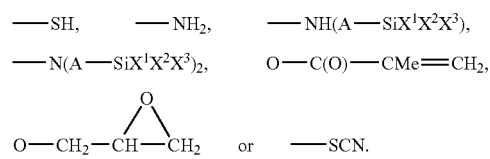

O—CH$_2$—CH—CH$_2$   or   —SCN.

The following compounds, for example, can be used as the silane of the general formula (VI):

(MeO)$_3$Si—(CH$_2$)$_3$—SH, (MeO)$_3$Si—(CH$_2$)$_3$—NH$_2$, (MeO)$_3$Si—(CH$_2$)$_3$—SCN, (MeO)$_3$Si—(CH$_2$)$_3$—O—C(O)CMe=CH$_2$, (EtO)$_3$Si—(CH$_2$)$_3$—NH$_2$, (EtO)$_3$Si—(CH$_2$)$_3$—SH, (EtO)$_3$Si—(CH$_2$)$_3$—SCN, (EtO)$_3$Si—(CH$_2$)$_3$—O—C(O)CMe=CH$_2$, (C$_3$H$_7$O)$_3$Si—(CH$_2$)$_3$—SH, (C$_3$H$_7$O)$_3$Si—(CH$_2$)$_3$—SCN, (C$_3$H$_7$O)$_3$Si—(CH$_2$)$_3$—O—C(O)CMe=CH$_2$, (C$_3$H$_7$O)$_3$Si—(CH$_2$)$_3$—NH$_2$, [(MeO)$_3$Si—(CH$_2$)$_3$—]$_2$NH, [(EtO)$_3$Si—(CH$_2$)$_3$—]$_2$NH, [(C$_3$H$_7$O)$_3$Si—(CH$_2$)$_3$—]$_2$NH, (C$_{12}$H$_{25}$O)$_3$—Si—(CH$_2$)$_3$—SH, (C$_{12}$H$_{25}$O)$_2$(MeO)-Si—(CH$_2$)$_3$—SH, (C$_{12}$H$_{25}$O)$_2$(EtO)-Si—(CH$_2$)$_3$—SH, (C$_{12}$H$_{25}$O)$_2$(C$_{14}$H$_{29}$O)—Si—(CH$_2$)$_3$—SH, (C$_{12}$H$_{25}$O)$_2$(C$_{16}$H$_{33}$O)—Si—(CH$_2$)$_3$—SH, (C$_{12}$H$_{25}$O)$_2$(C$_{18}$H$_{37}$O)—Si—(CH$_2$)$_3$—SH, (C$_{14}$H$_{29}$O)$_3$—Si—(CH$_2$)$_3$—SH, (C$_{14}$H$_{29}$O)$_2$(MeO)-Si—(CH$_2$)$_3$—SH, (C$_{14}$H$_{29}$O)$_2$(EtO)-Si—(CH$_2$)$_3$—SH, (C$_{14}$H$_{29}$O)$_2$(C$_{12}$H$_{25}$O)—Si—(CH$_2$)$_3$—SH, (C$_{14}$H$_{29}$O)$_2$(C$_{16}$H$_{33}$O)—Si—(CH$_2$)$_3$—SH, (C$_{14}$H$_{29}$O)$_2$(C$_{18}$H$_{37}$O)—Si—(CH$_2$)$_3$—SH, (C$_{16}$H$_{33}$O)$_3$—Si—(CH$_2$)$_3$—SH, (C$_{16}$H$_{33}$O)$_2$(MeO)-Si—(CH$_2$)$_3$—SH, (C$_{16}$H$_{33}$O)$_2$(EtO)-Si—(CH$_2$)$_3$—SH, (C$_{16}$H$_{33}$O)$_2$(C$_{12}$H$_{25}$O)—Si—(CH$_2$)$_3$—SH, (C$_{16}$H$_{33}$O)$_2$(C$_{14}$H$_{29}$O)—Si—(CH$_2$)$_3$—SH, (C$_{16}$H$_{33}$O)$_2$(C$_{18}$H$_{37}$O)—Si—(CH$_2$)$_3$—SH, (C$_{18}$H$_{37}$O)$_3$—Si—(CH$_2$)$_3$—SH, (C$_{18}$H$_{37}$O)$_2$(MeO)-Si—(CH$_2$)$_3$—SH, (C$_{18}$H$_{37}$O)$_2$(EtO)-Si—(CH$_2$)$_3$—SH, (C$_{18}$H$_{37}$O)$_2$(C$_{12}$H$_{25}$O)—Si—(CH$_2$)$_3$—SH, (C$_{18}$H$_{37}$O)$_2$(C$_{14}$H$_{29}$O)—Si—(CH$_2$)$_3$—SH, (C$_{18}$H$_{37}$O)$_2$(C$_{16}$H$_{33}$O)—Si—(CH$_2$)$_3$—SH, (C$_{12}$H$_{25}$O)$_2$(MeO)-Si—(CH$_2$)$_3$—NH$_2$, (C$_{12}$H$_{25}$O)$_2$(EtO)-Si—(CH$_2$)$_3$—NH$_2$ (C$_{12}$H$_{25}$O)$_2$(C$_{14}$H$_{29}$O)—Si—(CH$_2$)$_3$—NH$_2$, (C$_{12}$H$_{25}$O)$_2$(C$_{16}$H$_{33}$O)—Si—(CH$_2$)$_3$—NH$_2$, (C$_{12}$H$_{25}$O)$_2$(C$_{18}$H$_{37}$O)—Si—(CH$_2$)$_3$—NH$_2$, (C$_{14}$H$_{29}$O)$_2$(MeO)-Si—(CH$_2$)$_3$—NH$_2$, (C$_{14}$H$_{29}$O)$_2$(EtO)-Si—(CH$_2$)$_3$—NH$_2$, (C$_{14}$H$_{29}$O)$_2$(C$_{12}$H$_{25}$O)—Si—(CH$_2$)$_3$—NH$_2$, (C$_{14}$H$_{29}$O)$_2$(C$_{16}$H$_{33}$O)—Si—(CH$_2$)$_3$—NH$_2$, (C$_{14}$H$_{29}$O)$_2$(C$_{18}$H$_{37}$O)—Si—(CH$_2$)$_3$—NH$_2$, (C$_{16}$H$_{33}$O)$_2$(MeO)-Si—(CH$_2$)$_3$—NH$_2$, (C$_{16}$H$_{33}$O)$_2$(EtO)-Si—(CH$_2$)$_3$—NH$_2$, (C$_{16}$H$_{33}$O)$_2$(C$_{12}$H$_{25}$O)—Si—(CH$_2$)$_3$—NH$_2$, (C$_{16}$H$_{33}$O)$_2$(C$_{14}$H$_{29}$O)—Si—(CH$_2$)$_3$—NH$_2$, (C$_{16}$H$_{33}$O)$_2$(C$_{18}$H$_{37}$O)—Si—(CH$_2$)$_3$—NH$_2$, (C$_{18}$H$_{37}$O)$_2$(MeO)-Si—(CH$_2$)$_3$—NH$_2$, (C$_{18}$H$_{37}$O)$_2$(EtO)-Si—(CH$_2$)$_3$—NH$_2$, (C$_{18}$H$_{37}$O)$_2$(C$_{12}$H$_{25}$O)—Si—(CH$_2$)$_3$—NH$_2$, (C$_{18}$H$_{37}$O)$_2$(C$_{14}$H$_{29}$O)—Si—(CH$_2$)$_3$—NH$_2$, (C$_{18}$H$_{37}$O)$_2$(C$_{16}$H$_{33}$O)—Si—(CH$_2$)$_3$—NH$_2$, (C$_{12}$H$_{25}$O)$_2$(C$_{14}$H$_{29}$O)—Si—(CH$_2$)$_3$—SCN, (C$_{12}$H$_{25}$O)$_2$(C$_{16}$H$_{33}$O)—Si—(CH$_2$)$_3$—SCN, (C$_{12}$H$_{25}$O)$_2$(C$_{18}$H$_{37}$O)—Si—(CH$_2$)$_3$—SCN, (C$_{14}$H$_{29}$O)$_2$(C$_{12}$H$_{25}$O)—Si—(CH$_2$)$_3$—SCN, (C$_{14}$H$_{29}$O)$_2$(C$_{16}$H$_{33}$O)—Si—(CH$_2$)$_3$—SCN, (C$_{14}$H$_{29}$O)$_2$(C$_{18}$H$_{37}$O)—Si—(CH$_2$)$_3$—SCN, (C$_{16}$H$_{33}$O)$_2$(C$_{12}$H$_{25}$O)—Si—(CH$_2$)$_3$—SCN, (C$_{16}$H$_{33}$O)$_2$(C$_{14}$H$_{29}$O)—Si—(CH$_2$)$_3$—SCN, (C$_{16}$H$_{33}$O)$_2$(C$_{18}$H$_{37}$O)—Si—(CH$_2$)$_3$—SCN, (C$_{18}$H$_{37}$O)$_2$(C$_{12}$H$_{25}$O)—Si—(CH$_2$)$_3$—SCN, (C$_{18}$H$_{37}$O)$_2$(C$_{14}$H$_{29}$O)—Si—(CH$_2$)$_3$—SCN, (C$_{18}$H$_{37}$O)$_2$(C$_{16}$H$_{33}$O)—Si—(CH$_2$)$_3$—SCN, (C$_{12}$H$_{25}$O)$_2$(MeO)-Si—(CH$_2$)$_3$—O—C(O)CMe=CH$_2$, (C$_{12}$H$_{25}$O)$_2$(EtO)-Si—(CH$_2$)$_3$—O—C(O)CMe=CH$_2$, (C$_{14}$H$_{29}$O)$_2$(MeO)-Si—(CH$_2$)$_3$—O—C(O) CMe=CH$_2$, (C$_{14}$H$_{29}$O)$_2$(EtO)-Si—(CH$_2$)$_3$—O—C(O)CMe=CH$_2$, (C$_{16}$H$_{33}$O) 2 (MeO)-Si—(CH$_2$)$_3$—O—C(O) CMe=CH$_2$, (C$_{16}$H$_{33}$O)$_2$ (EtO)-Si—(CH$_2$)$_3$—O—C(O) CMe=CH$_2$, (C$_{18}$H$_{37}$O)$_2$(MeO)-Si—(CH$_2$)$_3$—O—C(O) CMe=CH$_2$, (C$_{18}$H$_{37}$O)$_2$(EtO)-Si—(CH$_2$)$_3$—O—C(O)CMe=CH$_2$, or mixtures of the abovementioned silanes.

Oligomers, i.e., oligo- and polysiloxanes, or co-oligomers of the silanes of the general formula (I)-(VI) or mixtures thereof can also be used as the silane. The siloxanes can be obtained by oligomerization or co-oligomerization of the corresponding silane compounds of the general formulae (I)-(VI) by addition of water and the addition of additives which is known to the expert in this field. Oligomeric silanes are described, for example, in EP 652 245 B1, EP 0 700 951 B1, EP 0 978 525 A2 and DE 199 29 021 A1.

In the context of the present invention, silane also includes mixtures of silanes, for example mixtures of the silanes of the general formula (I)-(VI) or mixtures of the oligomeric or polymeric siloxanes of silanes of the general formula (I)-(VI) or mixtures of the silanes of the general formula (I)-(VI) with mixtures of the oligomeric or polymeric siloxanes of silanes of the general formula (I)-(VI).

Untreated oxidic or silicatic fillers include a microbeaded, granular or pulverulent naturally occurring and/or synthetic filler or mixtures of microbeaded, granular or pulverulent naturally occurring and/or synthetic fillers. The silane-modified, oxidic or silicatic filler from which substances are extracted with a compressed gas can predominantly be pulverulent, bead-shaped, spherical, round and/or homogeneously shaped.

The silane-modified oxidic or silicatic filler should be compatible with rubbers and should have the fine division and reinforcing action in the polymer matrix which are necessary for this use. Silicate, for example kaolin, mica, kieselguhr, diatomaceous earth, talc, wollastonite or clay, or also silicates inter alia in the form of glass beads, ground glass chips (powdered glass), glass fibres or glass woven fabrics can be employed as the silicatic filler.

All types of metal oxides, for example aluminium oxide, aluminium hydroxide or trihydrate, zinc oxide, boron oxides, magnesium oxides or also transition metal oxides, such as titanium dioxide, can be employed as oxidic fillers.

Aluminium silicates, silicates, zeolites, precipitated or pyrogenic silicas having BET surface areas (measured with gaseous nitrogen) of 1 to 1,000 $m^2/g$, preferably up to 300 $m^2/g$, should generally be employed as the oxidic or silicatic filler. For example, the precipitated silicas Ultrasil 7000, Ultrasil 7005, VN2 or VN3 marketed by Degussa AG, and the silicas Hi-Sil® 170G Hi-Sil® 190G, Hi-Sil® 195G, Hi-Sil® 210, Hi-Sil® 233, Hi-Sil® 243LD, Hi-Sil® 315 or Hi-Sil® EZ marketed by PPG Industries Inc. and the products Zeosil 115 GR, Zeosil '125 GR, Zeosil 165 GR, Zeosil 175 GR, Zeosil 195 GR, Zeosil 215 GR, Zeosil 1115 MP, Zeosil 1135 MP, Zeosil 1165 MP, Zeosil 1165 MPS or Zeosil 1205 MP marketed by Rhodia can be employed. The pyrogenic silicas of the Aerosil series marketed by Degussa AG or pyrogenic oxides of titanium, zinc or other transition metals can also be employed as can, for example, the pyrogenic silicas of the Cabosil series marketed by Cabot.

Oxidic or silicatic fillers from other manufacturers which have similar properties or product characteristics to those mentioned above can also be used.

Compounds which are gaseous under normal temperature and pressure conditions and are suitable as a reaction matrix for the silane/filler mixtures can be used as the compressed gas. Suitable compounds include: carbon dioxide, helium, nitrogen, dinitrogen monoxide, sulfur hexafluoride, gaseous alkanes having 1 to 5 C atoms (for example methane, ethane, propane, n-butane, isobutane and neopentane), gaseous alkenes having 2 to 4 C atoms (for example ethylene, propylene and butene), gaseous alkynes (for example acetylene, propyne and but-1-yne), gaseous dienes (for example propadiene), gaseous fluorohydrocarbons and chloro- and/or fluorochlorohydrocarbons (for example freons, CFC, HCFC) or substitutes therefor used due to current legislation, or ammonia, as well as mixtures of these compounds.

Carbon dioxide is preferred as the compressed gas, since it is non-toxic, non-combustible, not very reactive and inexpensive. Furthermore, the required supercritical conditions or conditions close to critical can easily be achieved, since the critical pressure and the critical temperature for carbon dioxide are only 73 bar and 31° C.

Compressed gases are defined, for example, in E. Stahl, K. W. Quirin, D. Gerard, "Verdichtete Gase zur Extraktion und Raffination [Compressed Gases for Extraction and Refining]", Springer-Verlag, 1988. Compressed gases can be supercritical gases, critical gases or gases in the liquefied state. Such gases are described, for example, in P. G. Jessop and W. Leitner "Chemical Synthesis using Supercritical Fluids" Wiley-VCH Verlag, 1999.

After the silanization of the filler has been concluded, compressed gases can easily be separated, since they are in gaseous form under normal conditions and specifically in the case of carbon dioxide, there is hardly any environmental hazard potential since it is absorbed in the natural carbon cycle or can easily be recycled.

The gas can be put under pressure in a chamber or container which is sealed air-tight and which contains the material to be treated. During this process, the pressure can be increased, in general starting from atmospheric pressure, up to the working pressure of the process according to the invention.

The silanes used can be in the compressed gas in undissolved, partly dissolved or completely dissolved form. The oxidic or silicatic filler and the silane can first be mixed thoroughly or brought into contact and then mixed or brought into contact with the gas in the compressed state.

The oxidic or silicatic filler can first be mixed thoroughly or brought into contact with the gas in the compressed state and then mixed or brought into contact with the silane. Similarly, the silane can first be mixed thoroughly or brought into contact with the gas in the compressed state and then mixed or brought into contact with the corresponding oxidic or silicatic filler.

"Brought into contact" will be understood as meaning that the material mentioned is immersed, wetted or covered, is present in dissolved or non-dissolved form or is present in suspended or adsorbed or absorbed form. The "bringing into contact" can take place, for example, in a container or in a hermetically sealed chamber into which the non-modified filler, the silane component and the gas which can potentially be transformed into the compressed state are suitably incorporated.

The contact between the homogeneously mixed silane and filler component and the gas which can potentially be transformed into the compressed state can be established, for example, in a container or in a hermetically sealed chamber into which the mixture of filler and silane can be suitably introduced. "Establishing contact" can be understood as meaning that the material mentioned is immersed in the extraction medium and wetted and covered by this, preferably that the oxidic or silicatic filler is immersed completely, or also that all the external and internal surfaces of the oxidic or silicatic filler are in contact with the compressed gas.

In the process according to the invention, the pressure, which is also called the working pressure, should in general be between 1 and 2,000 bar, preferably between 1 and 300 bar, particularly preferably between 1 and 200 bar, especially preferably between 1 and 150 bar. The temperature (working temperature) at which the process should be carried out is between 0 and 300° C., preferably between 0 and 200° C., particularly preferably between 0 and 130° C.

The extraction can be carried out in a typical pressure container for high temperature/high pressure reactions or high pressure extractions. The pressure can be kept constant at various pressure levels for periods of up to 720 min, preferably 1-360 min, particularly preferably 1-180 min during the extraction, and during this period the filler can be immersed in the compressed gas and flowed through or streamed through by this.

Additives can be added to the oxidic or silicatic filler and/or the silane before the extraction with compressed gases. Alternatively, the filler can be brought into contact with additional additives during the extraction with compressed gases. For example, additives can be introduced into the stream of compressed gas which is fed in or removed and flows through the silane-modified, oxidic or silicatic filler.

Additives which can be employed are ammonia, sulfur dioxide, water, short-chain or long-chain polyethers or polyether alcohols, for example diethylene glycol, triethylene glycol or other polyethylene glycols or also polyethylene glycol alkyl ethers [HO—$(CH_2$—$CH_2$—O$)_x$-alkyl]; x'=1-15, having molecular weights of >100 g/mol, short-chain or long-chain amines having molecular weights of >50 g/mol, emulsion-forming agents or also short-chain or long-chain silicone oils, for example silicone oils having molecular weights of >100 g/mol or also recurring units D>2, or mixtures of the abovementioned compounds.

After the extraction, the silane-modified, oxidic or silicatic filler can pass through an evacuation or pressure release stage with removal of the compressed gas and the additives added or a portion of the additives added from the end product. The evacuation or pressure release stage can be carried out in a period of up to 180 min, preferably between 1 min and 120 min, particularly preferably between 1 min and 60 min. The temperature during this stage should be between −50° C. and 300° C., preferably between 1 and 200° C., particularly preferably between 1 and 150° C., and very particularly preferably at temperatures of between 1 and 130° C.

The silane-modified oxidic or silicatic filler treated with compressed gases can be subjected to an additional compacting or working step.

The silane-modified oxidic or silicatic filler treated with compressed gases can be used in paints, lacquers, printing inks, coverings, coatings, adhesives and lubricants, cosmetics, toothpastes, building auxiliaries or as a filler in vulcanizable rubbers or silicones or in plastics.

The silane-modified oxidic or silicatic fillers prepared with the process according to the invention have the advantage of a higher storage stability compared with known silane-modified fillers, for example bis(3-triethoxysilylpropyl)tetrasulfane on silica (VP Coupsil 8108 from Degussa). The fillers prepared according to the invention also have, by comparison, a lower content of alcohol which can potentially be liberated, in general ethanol. During storage, a smaller amount of volatile organic constituents (VOC) is liberated.

EXAMPLES

1. Comparison Examples 1-9 (Experiments without Recycling of $CO_2$)

The comparison examples listed below in Tables 1-2 are carried out in a high pressure extraction installation for solids having an autoclave volume of 50 l.

In each case 8 kg of precipitated silica Ultrasil 7005 (Degussa AG; analytical characteristic values: BET=185 m$^2$/g in accordance with ISO 5794/Annexe D, CTAB surface area=173 m$^2$/g, loss on drying=5.5 wt. % (DIN ISO787-2)) are mixed physically in a Ruberg mixer with 580 g Si 266 (Degussa AG; bis-[triethoxysilylpropyl]disulfane having an average chain length of 2.25).

The physically pretreated silica is filled into an insert container (volume 35 l) which is closed with sintered plates at the top and bottom. The completely filled insert container is inserted into the autoclave of a high pressure extraction installation (fixed bed). The autoclave is brought under pressure with the aid of a high pressure membrane pump and is flowed through by carbon dioxide, which is conveyed by a high pressure pump, in accordance with the pressures, temperatures and times listed in Tables 1-2. It is attempted to avoid variations in pressure. The amount of water stated in Tables 1-2 is metered into the $CO_2$ stream before entry into the autoclave.

After flowing through the autoclave of the high pressure extraction installation, the ethanol-laden carbon dioxide is fed to a separator in which it is converted into the gaseous state, with a lowering in pressure (and lowering in temperature), the solubility of the constituents of the fluid (water, ethanol) decreasing and these thereby largely being separated off.

After the separator, the gaseous carbon dioxide is condensed via a condenser and fed to a pressure container, in which it remains. No circulatory operation is realized, but clean, ethanol-free $CO_2$ is always conveyed from a separate reservoir tank by the abovementioned high pressure membrane pump, compressed and used for the extraction of the silane-modified silica.

TABLE 1

| | Parameter | | | | | | Water (Karl-Fischer titration) in wt. % | EtOH Total amount of EtOH in wt. % |
|---|---|---|---|---|---|---|---|---|
| | Si 266 [phf] | Pressure [bar] | Time [min] | Amount of $CO_2$ [kg] | Minimum temperature at the $CO_2$ entry in the autoclave [° C.] | Sample | | |
| Comparison Example 1 | 7.25 | 70<br>80<br>100<br>260 | 30<br>30<br>60<br>30 | 200 | 100 | 0.7% $H_2O$ fed into the $CO_2$ stream | mixed sample | 10.5 | 1.1 |
| Comparison Example 2 | 7.25 | 100<br>260 | 120<br>30 | 200 | 100 | 0.7% $H_2O$ fed into the $CO_2$ stream | mixed sample | 10.8 | 1.2 |
| Comparison Example 3 | 7.25 | 100 | 150 | 200 | 100 | 0.7% $H_2O$ fed into the $CO_2$ stream | mixed sample | 9.7 | 1.3 |
| Comparison | 9.06 | 100 | 120 | 200 | 100 | 0.7% $H_2O$ | mixed sample | 8.4 | 1.5 |

TABLE 1-continued

| | Parameter | | | | | | | |
|---|---|---|---|---|---|---|---|---|
| | Si 266 [phf] | Pressure [bar] | Time [min] | Amount of CO₂ [kg] | Minimum temperature at the CO₂ entry in the autoclave [° C.] | Sample | Water (Karl-Fischer titration) in wt. % | EtOH Total amount of EtOH in wt. % |
| Example 4 | | 260 | 30 | | | fed into the CO₂ stream | | |
| Comparison Example 5 | 11.8 | 100 260 | 150 30 | 240 | 100 | 0.7% H₂O fed into the CO₂ stream | mixed sample | 9.3 | 1.6 |
| Comparison Example 6 | 9.06 | 100 260 | 210 30 | 240 | 100 | 0.7% H₂O fed into the CO₂ stream | mixed sample | 11.5 | 0.9 |
| Comparison Example 7 | 11.8 | 100 260 | 240 30 | 280 | 100 | 0.7% H₂O fed into the CO₂ stream | mixed sample | 12.2 | 1.4 |

TABLE 2

| | Parameter | | | | | | | |
|---|---|---|---|---|---|---|---|---|
| | Si 266 [phf] | Pressure [bar] | Time [min] | Amount of CO₂ [kg] | Minimum temperature at the CO₂ entry in the autoclave [° C.] | Sample | Water (Karl-Fischer titration) in wt. % | EtOH (total amount of EtOH) in wt. % |
| Comparison Example 8 | 7.25 | 90 260 | 120 30 | 200 | 100 | 0.7% H₂O fed into the CO₂ stream | mixed sample | 10.1 | 1.1 |
| Comparison Example 9 | 11.8 | 90 260 | 240 30 | 360 | 100 | 0.7% H₂O fed into the CO₂ stream | mixed sample | 13.0 | 1.6 |

2. Comparison Examples 10-11 (According to EP 1256604 A2; Example A and B)

Comparison Example 10 (Example A According to EP 1256604 A2)

1,500 g Ultrasil VN3 are filled into a drum mixer (4 baffles having a height of 7 cm). The drum is rotated at 20 rpm on a rolling stand at an inclined position of 18°. 120 g Si 69 (8 phf) are sprayed in through a 6 cm hole in the drum cover by means of a commercially available manual spray pump in the course of 55 min. An after-running time of the drum of 5 min is then maintained.

130 g of the silica precoated with Si 69 are then filled into the 600 ml insert container of a high pressure extraction autoclave, which is preheated to 70° C. The pressure is increased slowly to 150 bar by pumping in $CO_2$. After standing for 15 min, the temperature is increased to 100° C. by the jacket heating of the autoclave. The system is kept constant at 100° C. under 200 bar for one hour. The pressure is then lowered slowly to 80 bar. Extraction is carried out with 1.2 kg $CO_2$ under 80 bar at 100° C. for 25 min. Finally, extraction is carried out with 0.5 kg $CO_2$ under 300 bar at 80° C. for 30 min. The system is then let down and the modified filler is removed.

Comparison Example 11 (Example B According to EP 1256604 A2)

2,000 g Ultrasil VN3 are dried at 105° C. in a circulating air cabinet for 2 h. 1,500 g of the dried Ultrasil VN3 are filled into a drum mixer (4 baffles having a height of 7 cm). The drum is rotated at 20 rpm on a rolling stand at an inclined position of 18°. 120 g Si 69 (8 phf) are sprayed in through a 6 cm hole in the drum cover by means of a commercially available manual spray pump in the course of 55 min. An after-running time of the drum of 5 min is then maintained.

130 g of the silica precoated with Si 69 are then filled into the 600 ml insert container of a high pressure extraction autoclave, which is preheated to 70° C. The pressure is increased slowly to 150 bar by pumping in $CO_2$. After standing for 15 min, the temperature is increased to 100° C. by the jacket heating of the autoclave. The system is kept constant at 100° C. under 200 bar for one hour. The pressure is then lowered slowly to 80 bar. Extraction is carried out with 1.2 kg $CO_2$ under 80 bar at 100° C. for 25 min. Finally, extraction is carried out with 0.5 kg $CO_2$ under 300 bar at 80° C. for 30 min. The system is then let down and the modified filler is removed. The results of the analysis are shown in table 3.

TABLE 3

Results of the analysis of Comparison Examples 10 and 11

| | Unit | Comparison example 10 | Comparison example 11 |
|---|---|---|---|
| Ethanol content | wt. % | 1.8 | 3.0 |
| Ethanol content | µmol/g of product | 388 | 649 |

3. Comparison Examples 12-17 (According to EP 1357156 A2; Example 16-21)

Comparison Examples from EP 1357156 A2

The experiments listed below are carried out in a high pressure extraction installation for solids having an autoclave volume of 50 l.

In each case 8 kg of precipitated silica Ultrasil 7005 (Degussa AG; analytical characteristic values: BET=185 $m^2/g$ in accordance with ISO 5794/Annexe D, CTAB surface area=173 $m^2/g$, loss on drying=5.5 wt. % (DIN ISO0787-2)) are physically precoated and mixed in a Ruberg mixer with 640 g Si69 (Degussa AG; bis-(triethoxysilylpropyltetra-sulfane)). In some experiments, additional amounts of water are then sprayed on to the mixture of silica and silane (Comparison Examples 13+14 and 16+17).

The silica precoated physically with Si69 is filled into an insert container (volume 35 l) which is closed with sintered plates at the top and bottom. The completely filled insert container is inserted into the autoclave of a high pressure extraction installation (fixed bed). The autoclave is brought under pressure with the aid of a high pressure membrane pump and is flowed through by defined amounts of carbon dioxide, which are conveyed by a high pressure pump, in accordance with the pressures and temperatures listed in Tables 4+5 over specified periods of time. Primary reaction is understood as meaning the chemical and/or physical immobilization of the silane on the filler. Extraction is understood as meaning the partial/complete hydrolysis of the silane and removal of the alcohol. In the examples listed, 0.2 wt. % of water (based on the mass of $CO_2$ used) is metered into the $CO_2$ stream before entry into the autoclave. After the fixed bed reactor, the laden carbon dioxide is fed to a separator in which it is converted into the gaseous state, with a lowering in pressure and/or increase in temperature, the solubility of the constituents of the fluid (for example extracted ethanol) decreasing and these thereby largely being separated off. After the separator, the gaseous carbon dioxide is condensed via a condenser and fed to a buffer container, from where it can be sucked up again by the high pressure pump and employed for the extraction (circulatory process).

TABLE 4

| Comparison Example No. | Silica | Silane coating in phf (Si 69) | Water added in phf | Water metered into sc $CO_2$ | Pressure in bar | Temperature in ° C. | Time in min | Carbon dioxide throughput in kg |
|---|---|---|---|---|---|---|---|---|
| 12 | Ultrasil 7005 | 8 | 0 | | 100 | average 70 | 10 | |
| Extraction | Ultrasil 7005 | | | +0.2% $H_2O$ based on $CO_2$ | 100 | 80-87 | 60 | 160 kg |
| 13 | Ultrasil 7005 | 8 | 5 | | 100 | average 70 | 10 | |
| Extraction | Ultrasil 7005 | | | +0.2% $H_2O$ based on $CO_2$ | 100 | 80-87 | 60 | 160 kg |
| 14 | Ultrasil 7005 | 8 | 8 | | 100 | average 70 | 10 | |
| Extraction | Ultrasil 7005 | | | +0.2% $H_2O$ based on $CO_2$ | 100 | 77-88 | 80 min | 160 kg |

TABLE 5

| | Silica | Silane coating in phf (Si 69) | Water added in phf | Water metered into sc $CO_2$ | Pressure in bar | Temperature in ° C. | Time in min | Carbon dioxide throughput in kg |
|---|---|---|---|---|---|---|---|---|
| 15 | Ultrasil 7005 | 8 | 0 | +0.2% $H_2O$ based on $CO_2$ | 8 pressure pulsations between 60 and 100 bar | average 70 | 150 | |
| Extraction | Ultrasil 7005 | | | +0.2% $H_2O$ based on $CO_2$ | 100 | 85 | 60 | 160 kg |
| 16 | Ultrasil 7005 | 8 | 5 | +0.2% $H_2O$ based on $CO_2$ | 8 pressure pulsations between 60 and 100 bar | average 70 | 150 | |
| Extraction | Ultrasil 7005 | | | +0.2% $H_2O$ based on $CO_2$ | 100 | 85 | 60 | 160 kg |
| 17 | Ultrasil 7005 | 8 | 8 | +0.2% $H_2O$ based on $CO_2$ | 8 pressure pulsations between 60 and 100 bar | average 70 | 150 | |
| Extraction | Ultrasil 7005 | | | +0.2% $H_2O$ based on $CO_2$ | 100 | 85 | 60 | 160 kg |

The analytical results of Comparison Examples 12-17 are summarized in Table 6.

TABLE 6

Analytical values of Comparison Examples 12-17

| Example no. | Average ethanol content ?mol/g | Average ethanol content wt. % | Water content in wt. % |
|---|---|---|---|
| 12 | 609 | 2.8 | 3.79 |
| 13 | 540 | 2.5 | 4.15 |
| 14 | 444 | 2 | 5.07 |
| 15 | 502 | 2.3 | 4.09 |
| 16 | 472 | 2.2 | 4.28 |
| 17 | 499 | 2.3 | 4.95 |

Examples 1-17

The examples according to the invention listed below (Tables 7-8) are carried out in a high pressure extraction installation for solids having an autoclave volume of 50 l.

In each case 8 kg of precipitated silica Ultrasil 7005 (Degussa AG; analytical characteristic values: BET=185 $m^2/g$ in accordance with ISO 5794/Annexe D, CTAB surface area=173 $m^2/g$, loss on drying=5.5 wt. % (DIN ISO0787-2)) are mixed physically in a Ruberg mixer with 580 g Si 266 (Degussa AG; bis-[triethoxysilylpropyl]disulfane having an average chain length of 2.25).

The physically pretreated silica is filled into an insert container (volume 35 l) which is closed with sintered plates at the top and bottom. The completely filled insert container is inserted into the autoclave of a high pressure extraction installation (fixed bed). The autoclave is brought under pressure with the aid of a high pressure membrane pump and is flowed through by the stated amounts of carbon dioxide, which are conveyed by a high pressure pump, in accordance with the pressures, temperatures and times listed in Tables 7-8. It is attempted here to avoid variations in pressure. The amount of water stated in Tables 7-8 is metered into the $CO_2$ stream before entry into the autoclave.

After the fixed bed extractor, the laden carbon dioxide is fed to a high pressure washer in which it comes into contact with the amounts of water (absorbent) described in Tables 7-8. The high pressure washer comprises a pressure container, which is modified with packing. Fresh water is fed into the high pressure washer from the top, while the carbon dioxide enters into the washer from the bottom. Ethanol-contaminated water is removed from the high pressure washer from the bottom. The water (absorbent) can be filled into the washer or removed from this continuously or discontinuously.

After the high pressure washer, the carbon dioxide is fed to a separator in which it is converted into the gaseous state, with a lowering in pressure, the solubility for the constituents of the fluid decreasing and these thereby largely being separated off.

After the separator, the gaseous carbon dioxide is condensed via a condenser and fed to a buffer container, from where it is sucked up again by the high pressure pump and employed for the extraction (circulatory process).

TABLE 7

| | | Parameter | | | | | | Sampling top, middle and bottom in the | | |
|---|---|---|---|---|---|---|---|---|---|---|
| | | | | $H_2O$ feed | | | | | | |
| Example No. | Si 266 phf | $CO_2$ pressure bar | Temperature autoclave in ° C. | Temperature washer in ° C. | in $CO_2$ before the autoclave wt. % with respect to $CO_2$ throughput | in the washer liters/h | Time min | $CO_2$ throughput (autoclave) kg | autoclave in the same volumes; thorough mixing and analysis | Water (Karl-Fischer titration) in wt. % | EtOH (residual amount) in wt. % |
| 1 | 7.25 | 90-100 | 90 | 50-73 | 0.4 | 20 | 120 | 100 | mixed sample | 5.6 | 1.8 |
| 2 | 7.25 | 91-99 | 72-99 | 42-65 | 0.55 | 35 | 180 | 155 | mixed sample | 9.1 | 1.5 |
| 3 | 7.25 | 91-99 | 72-98 | 42-53 | 0.5 | 35 | 120 | 102 | mixed sample | 7.5 | 1.6 |
| 4 | 7.25 | 91-99 | 74-98 | 44-52 | 0.5 | 50 | 120 | 100 | mixed sample | 7.5 | 1.7 |
| 5 | 7.25 | 91-99 | 80-113 | 50-71 | 0.5 | 20 | 120 | 165 | mixed sample | 7.3 | 1.5 |
| 6 | 7.25 | 91-99 | 70-106 | 40-63 | 0.5 | 50 | 120 | 160 | mixed sample | 7.5 | 1.4 |
| 7 | 7.25 | 90-99 | 73-105 | 44-65 | 0.5 | 35 | 120 | 170 | mixed sample | 7.3 | 1.6 |
| 8 | 7.25 | 89-102 | 85-88 | 32-50 | 0.5 | 80 | 120 | 170 | mixed sample | 6.8 | 1.6 |

TABLE 8

| | | Parameter | | | | | | Sampling top, middle and bottom in the | | |
|---|---|---|---|---|---|---|---|---|---|---|
| | | | | $H_2O$ feed | | | | | | |
| Example No. | Si 266 phf | Pressure $CO_2$ bar | Temperature autoclave in ° C. | Temperature washer in ° C. | in $CO_2$ before the autoclave wt. % with respect to $CO_2$ throughput | in the washer liters/h | Time min | $CO_2$ throughput (autoclave) kg | autoclave in the same volumes; thorough mixing and analysis | Water (Karl-Fischer titration) in wt. % | EtOH (residual amount) in wt. % |
| 9 | 7.25 | 90-101 | 75-100 | 35-50 | 0.5 | 80 | 120 | 210 | mixed sample | 7.15 | 1.3 |
| 10 | 7.25 | 91-102 | 56-90 | 39-50 | 0.5 | 60 | 120 | 210 | mixed sample | 6.8 | 1.4 |
| 11 | 7.25 | 91-100 | 60-84 | 38-62 | 0.5 | 60 | 120 | 165 | mixed sample | 6.7 | 1.4 |
| 12 | 7.25 | 90-100 | 57-81 | 37-66 | 0.75 | 60 | 120 | 165 | mixed sample | 9.4 | 1.8 |
| 13 | 7.25 | 90-100 | 55-83 | 39-52 | 0.750 | 60 | 9030 | 210 | mixed sample | 9.0 | 1.4 |
| 14 | 7.25 | 92-102 | 61-90 | 37-47 | 0.750 | 80 | 9030 | 200 | mixed sample | 8.6 | 1.3 |

TABLE 8-continued

| | | | Parameter | | | | | Sampling top, middle and bottom in the | | |
|---|---|---|---|---|---|---|---|---|---|---|
| | | | | H₂O feed | | | | | | |
| Example No. | Si 266 phf | Pressure CO₂ bar | Temperature autoclave in ° C. | Temperature washer in ° C. | in CO₂ before the autoclave wt. % with respect to CO₂ throughput | in the washer liters/h | Time min | CO₂ throughput (autoclave) kg | autoclave in the same volumes; thorough mixing and analysis | Water (Karl-Fischer titration) in wt. % | EtOH (residual amount) in wt. % |
| 15 | 7.25 | 93-100 | 55-81 | 37-55 | 0.75 0 | 80 | 90 30 | 160 | mixed sample | 7.9 | 1.4 |
| 16 | 7.25 | 90-100 | 60-87 | 37-66 | 0.5 | 80 | 120 | 200 | mixed sample | 6.7 | 1.4 |
| 17 | 7.25 | 90-102 | 60-93 | 42-63 | 0.5 | 80 | 180 | 300 | mixed sample | 7.2 | 1.0 |

If the results obtained for the ethanol content of the comparison examples without recycling of $CO_2$ (Table 1-2; Comparison Example 3) are compared with those of the examples according to the invention in Tables 7+8, it is found that a high pressure washer is a surprisingly effective method for removing the ethanol from the extraction gas in the present case. The comparison examples without recycling of $CO_2$ into a $CO_2$ circulation correspond to or simulate here a washer having a 100% washing-out effectiveness with respect to the ethanol contained in the supercritical $CO_2$ (sc $CO_2$).

If the results obtained for the ethanol content in Comparison Examples 10 and 11 or 12-17 (circulatory processes in which sc $CO_2$ is conveyed through the filler fixed bed) are compared with those of Examples 1-17 according to the invention, an improvement due to lower ethanol contents of the modified fillers or
due to shorter, relative extraction times of the fillers to be modified by the utilization of the process according to the invention becomes clear.

Examples 18-25

Figure 20:
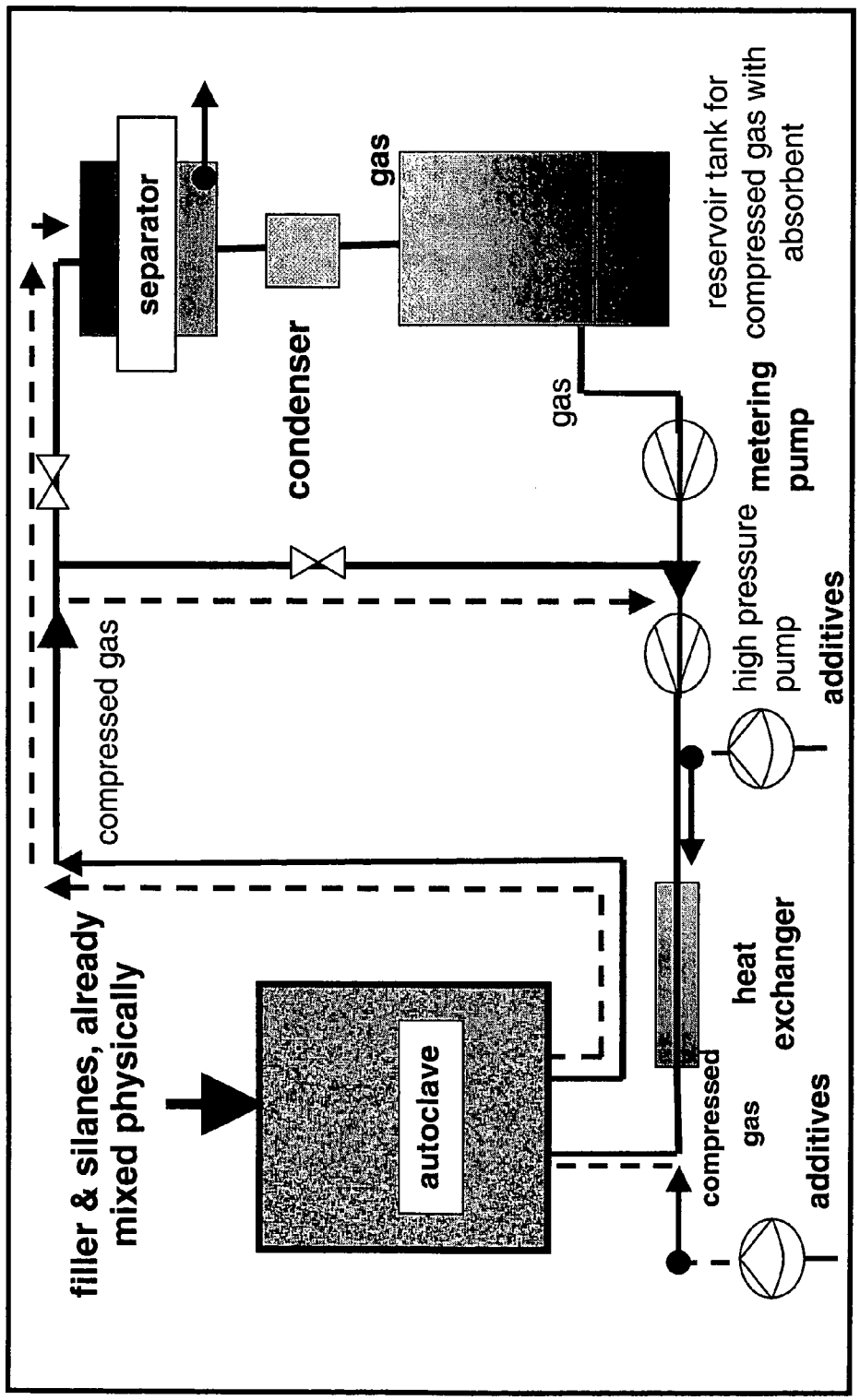

The experiments listed below in Tables 9+10 are carried out in a high pressure extraction installation for solids having an autoclave volume of 6,500 l. The construction of the high pressure extraction installation is outlined in FIG. 20. The construction of the high pressure autoclave in the high pressure extraction installation is outlined in FIG. 12.

Examples with the Silica Ultrasil 7005

In each case 1,300 kg of precipitated silica Ultrasil 7005 (Degussa AG; analytical characteristic values: BET=185 m²/g in accordance with ISO 5794/Annexe D, CTAB surface area=173 m²/g, loss on drying=5.5 wt. % (DIN ISO0787-2)) are mixed physically in a mixer with 104 kg Si 69 (Degussa AG; bis-[triethoxysilylpropyl]tetrasulfane) or 94 kg Si 266 (Degussa AG; bis-[triethoxysilylpropyl]disulfane). The amounts of water stated in Table 9+10 are then homogeneously distributed over the physical mixture of filler and silane.

Examples with the Silica Ultrasil 7000 (Powder)

In each case 1,410 kg of precipitated, pulverulent, non-compacted silica Ultrasil 7000 (Degussa AG; CTAB surface area (pH 9) 155 m²/g; loss on drying 5.5% (DIN ISO0787-2)), are mixed physically in a mixer with 112 kg Si 69 (Degussa AG; bis-[triethoxysilylpropyl]tetrasulfane) or 102 kg Si 266 (Degussa AG; bis-[triethoxysilylpropyl]disulfane). The amounts of water stated in Tables 9+10 are then homogeneously distributed over the physical mixture of filler and silane.

The silica modified physically in this manner is filled into the autoclave of the high pressure extraction installation and treated with compressed carbon dioxide (sc $CO_2$) and extracted in accordance with the conditions listed in Table 9+10.

After passage through the autoclave, the extraction gas ($CO_2$) laden with the extracted substances is transferred into a separator in which a portion of the substances extracted is separated off from the extraction gas. The extraction gas is then liquefied again and transferred into a reservoir container. The reservoir container contains the amounts of water listed in Tables 9+10, as an absorbent. After absorption of the entrained ethanol by the water in the reservoir container, the $CO_2$ is fed to the process again and in this way utilized in a circulatory procedure.

TABLE 9

| Example no. | Silica | Silane phf | Water addition in the mixer phf | Temperature of the CO₂ at the autoclave entry ° C. | Pressure at the autoclave entry bar | Extraction times min | Delivery of CO₂ pumps before the autoclave tonnes/h | Amount of water in the reservoir container at the start of extraction kg | Water fed into the CO₂ circulation kg/h |
|---|---|---|---|---|---|---|---|---|---|
| 18 | U 7005 | Si 69 | 8 | 100 | 70 | 60 | 4.5 | 150 | 20 |
| | | | | | 80 | 60 | 6 | | 20 |
| | | | | | 90 | 30 | 6 | | 20 |
| | | | | 108 | 90 | 30 | 8.4 | | 20 |
| | | | | | 100 | 30 | 8.4 | | 20 |
| | | | | | 60 | 20 | 0 | | 0 |
| 19 | U 7005 | Si 69 | 11 | 108 | 70 | 30 | 4.5 | 150 | 0 |

TABLE 9-continued

| Example no. | Silica | Silane phf | Water addition in the mixer phf | Temperature of the CO₂ at the autoclave entry ° C. | Pressure at the autoclave entry bar | Extraction times min | Delivery of CO₂ pumps before the autoclave tonnes/h | Amount of water in the reservoir container at the start of extraction kg | Water fed into the CO₂ circulation kg/h |
|---|---|---|---|---|---|---|---|---|---|
|  |  |  |  |  | 100 | 30 | 6 |  | 0 |
|  |  |  |  |  | 150 | 60 | 8.4 |  | 0 |
| 20 | U 7005 | Si 266 | 8 | 100 | 70 | 60 | 4.5 | 150 | 20 |
|  |  |  |  |  | 80 | 60 | 6 |  | 20 |
|  |  |  |  |  | 90 | 30 | 6 |  | 20 |
|  |  |  |  | 108 | 90 | 30 | 8.4 |  | 20 |
|  |  |  |  |  | 100 | 30 | 8.4 |  | 20 |
|  |  |  |  |  | 60 | 20 | 8.4 |  | 0 |
| 21 | U 7005 | Si 266 | 11 | 108 | 70 | 30 | 4.5 | 150 | 0 |
|  |  |  |  |  | 100 | 30 | 6 |  | 0 |
|  |  |  |  |  | 150 | 60 | 8.4 |  | 0 |
| 22 | U 7000 | Si 69 | 15 | 108 | 70 | 30 | 4.5 | 150 | 40 |
|  |  |  |  |  | 80 | 30 | 4.5 |  | 40 |
|  |  |  |  |  | 90 | 30 | 4.5 |  | 40 |
|  |  |  |  |  | 100 | 30 | 4.5 |  | 40 |
|  |  |  |  |  | 100 | 60 | 4.5 |  | 0 |

TABLE 10

| Example no. | Silica | Silane phf | Water addition in the mixer phf | Temperature of the CO₂ at the autoclave entry ° C. | Pressure at the autoclave entry bar | Extraction times min | Delivery of CO₂ pumps before the autoclave tonnes/h | Amount of water in the reservoir container at the start of extraction kg | Water fed into the CO₂ circulation kg/h |
|---|---|---|---|---|---|---|---|---|---|
| 23 | U 7000 | Si 69 | 11 | 108 | 70 | 30 | 4.5 | 150 | 0 |
|  |  |  |  |  | 85 | 30 | 4.5 |  | 0 |
|  |  |  |  |  | 100 | 30 | 4.5 |  | 0 |
|  |  |  |  |  | 150 | 30 | 4.5 |  | 0 |
| 24 | U 7000 | Si 266 | 15 | 108 | 70 | 30 | 4.5 | 150 | 40 |
|  |  |  |  |  | 80 | 30 | 4.5 |  | 40 |
|  |  |  |  |  | 90 | 30 | 4.5 |  | 40 |
|  |  |  |  |  | 100 | 30 | 4.5 |  | 40 |
|  |  |  |  |  | 100 | 60 | 4.5 |  | 0 |
| 25 | U 7000 | Si 266 | 11 | 108 | 70 | 30 | 4.5 | 150 | 0 |
|  |  |  |  |  | 85 | 30 | 4.5 |  | 0 |
|  |  |  |  |  | 100 | 30 | 4.5 |  | 0 |
|  |  |  |  |  | 150 | 30 | 4.5 |  | 0 |

Sampling and analysis of the samples takes place 1×per drum after filling with the modified filler which has been prepared (Table 11).

TABLE 11

| Example no. | Sample number | Water (Karl Fischer) wt. % | Ethanol content (HPLC) wt. % |
|---|---|---|---|
| 18 | 1 | 6.2 | 1.6 |
|  | 2 | 7.5 | 1.5 |
|  | 3 | 7.6 | 1.5 |
|  | 4 | 7.5 | 1.3 |
|  | 5 | 8.9 | 1.2 |
|  | 6 | 9.0 | 1.2 |
| 19 | 1 | 6.5 | 1.7 |
|  | 2 | 6.4 | 1.8 |
|  | 3 | 8.7 | 1.6 |
|  | 4 | 10.0 | 1.3 |
|  | 5 | 11.2 | 1.3 |
|  | 6 | 10.3 | 1.1 |
| 20 | 1 | 6.5 | 1.5 |
|  | 2 | 7.6 | 1.4 |
|  | 3 | 8.3 | 1.4 |
|  | 4 | 10.2 | 1.2 |
|  | 5 | 9.8 | 1.1 |
| 21 | 1 | 5.6 | 1.8 |
|  | 2 | 7.9 | 1.5 |
|  | 3 | 7.3 | 1.7 |
|  | 4 | 8.8 | 1.6 |
|  | 5 | 11.0 | 1.1 |
| 22 | 1 | 16.6 | 1.5 |
|  | 2 | 16.6 | 1.3 |
|  | 3 | 17.2 | 1.2 |
|  | 4 | 15.3 | 1.1 |
|  | 5 | 15.9 | 1.0 |
| 23 | 1 | 13.8 | 1.3 |
|  | 2 | 14.4 | 1.4 |
|  | 3 | 13.3 | 1.4 |
|  | 4 | 13.2 | 1.4 |
|  | 5 | 13.7 | 1.2 |
| 24 | 1 | 12.3 | 1.3 |
|  | 2 | 12.8 | 1.5 |
|  | 3 | 14.9 | 1.2 |
|  | 4 | 14.6 | 1.1 |
|  | 5 | 17.0 | 1.0 |
| 25 | 1 | 9.4 | 1.6 |
|  | 2 | 9.4 | 1.4 |
|  | 3 | 10.0 | 1.3 |

TABLE 11-continued

| Example no. | Sample number | Water (Karl Fischer) wt. % | Ethanol content (HPLC) wt. % |
|---|---|---|---|
| | 4 | 10.6 | 1.4 |
| | 5 | 6.5 | 1.4 |

If the results obtained for the ethanol content of the comparison examples without recycling of $CO_2$ (Table 1-2; Comparison Example 3) are compared with those of the examples according to the invention in Tables 9+10, it is found that the mere use of a sorbent (water) is a surprisingly effective method for achieving a reduction in the ethanol content on the modified filler in the present case. The use of a sorbent has the effect of an improvement (reduction in the residual amount of ethanol on the modified filler) compared with comparison examples 10-17, although the $CO_2$ used for the extraction and utilized in a circulatory process is also utilized in circulation and is not collected separately, as in the comparison examples without recycling of $CO_2$.

If the results obtained for the ethanol content in Comparison Examples 10 and 11 or 12-17 (circulatory processes in which sc $CO_2$ is conveyed through the filler fixed bed) are compared with those of Examples 18-25 according to the invention, an improvement
due to lower ethanol contents of the modified filler or
due to shorter, relative extraction times of the fillers to be modified by the utilization of the process according to the invention becomes clear.

Analytical methods for characterization of the silane-modified fillers:
The water content of the samples is determined as follows:

10 g of the silanized silica are comminuted with a mill for 15 seconds and the water content is then determined in accordance with the known rules with which the expert is familiar using a Karl Fischer Titrator (Metrohm, 720 KFS Titrino) and the Karl-Fischer titration chemicals obtainable from Merck, no. 1.09241, no. 1.09243 and no. 1.06664 (disodium tartrate dihydrate).

The residual alcohol (ethanol) on the filler is determined as follows in accordance with the working instructions described by Hunsche et al. in Kautschuk, Gummi, Kunststoffe 51, (1998) 525.

In a glass ampoule, which is provided with a tightly closing cap after filling, 10 ml diethylene glycol monobutyl ether (DEGMBE) and 0.3 ml 0.5 mol/l $H_2SO_4$ are added to 1 g of the filler according to the invention. The mixture is mixed thoroughly in the glass ampoule for 20 min at 60° C. in a water-bath. 10 ml decane are then added to the mixture, which is swiftly temperature-controlled at 25° C. Appropriate amounts are then removed from the thoroughly mixed organic phase for HPLC analysis (HPLC apparatus with a Jasco Autosampler 851-AS, Jasco pump PU 980, RI detector 7515A; $TiO_2$ column, 250×4.5 mm, 5 µm, YMC; mobile Phase: DEGMBE with cyclohexane; temperature 25° C.) for ethanol.

All references cited herein are fully incorporated by reference. Having now fully described the invention, it will be understood by those of skill in the art that the invention may be practiced within a wide and equivalent range of conditions, parameters and the like, without affecting the spirit or scope of the invention or any embodiment thereof.

What is claimed is:

1. A process for the extraction of substances from at least one silane-modified oxidic or silicatic filler, comprising:
    a) extracting said filler in a pressure container with at least one gas, wherein said gas is compressed by means of pressure and/or temperature and is passed through said filler in a radial direction; and
    b) removing the substances extracted in step a) from the compressed gas using a sorbent.

2. The process of claim 1, wherein said sorbent is selected from the group consisting of: active charcoals; zeolites; silica; silica gels; and water.

3. The process of claim 1, wherein substances extracted in step a) are removed from said gas by passing said gas through at least one sorption device.

4. The process of claim 1, wherein after the extraction of step a), the silane-modified fillers have a residual content of less than 75 mol % of the amount of alcohol present prior to extraction and which can be liberated by hydrolysis.

5. The process of claim 1, wherein said gas comprises at least one gas from the group consisting of: carbon dioxide; helium; nitrogen; dinitrogen monoxide; sulfur hexafluoride; gaseous alkanes having 1 to 5 C atoms; gaseous alkenes having 2 to 4 C atoms; gaseous alkynes; gaseous dienes; gaseous fluorohydrocarbons; chloro- and/or fluorochlorohydrocarbons; or ammonia; and mixtures of these gases.

6. The process of claim 1, wherein at least part of said process is carried out at a pressure between 1 and 300 bar.

7. The process of claim 1, wherein the extraction of step a) is carried out a temperature of between 0 and 200° C.

8. The process of claim 1, wherein the pressure is kept constant during the extraction of step a) for a period of up to 720 min and during this period said filler is immersed in, and permeated by, the compressed gas.

9. The process of claim 1, wherein the extraction of step a) is carried out under uniform conditions.

10. The process of claim 1, wherein said silane-modified oxidic or silicatic filler is brought into contact with at least one additional additive in the compressed gas.

11. The process of claim 10, wherein said additive is selected from the group consisting of: ammonia; water; sulfur dioxide; short-chain or long-chain polyethers; short-chain or long-chain amines; emulsion-forming agents; and short-chain or long-chain silicone oils.

12. The process of claim 1, wherein said process is carried out in at least one pressure autoclave or in at least two pressure containers connected in series or parallel.

13. A process for the extraction of substances from at least one silane-modified oxidic or silicatic filler, comprising extracting said filler with at least one gas wherein:
    a) said gas is compressed by means of pressure and/or temperature;
    b) the extraction of said filler takes place in a pressure container; and
    c) during extraction, said gas is passed through said filler in a radial direction.

14. The process of claim 13, further comprising removing substances extracted from said filler and in the compressed gas using a sorbent and wherein:
    a) said gas comprises at least one gas from the group consisting of: carbon dioxide; helium; nitrogen; dinitrogen monoxide; sulfur hexafluoride; gaseous alkanes having 1 to 5 C atoms; gaseous alkenes having 2 to 4 C atoms; gaseous alkynes; gaseous dienes; gaseous fluorohydrocarbons; chloro- and/or fluorochlorohydrocarbons; ammonia; and mixtures of these gases; and b) said sorbent is selected from the group consisting of: active charcoals; zeolites; silica; silica gels; and water.

15. The process of claim 13, wherein said silane-modified oxidic or silicatic filler is brought into contact with at least one additional additive in the compressed gas; said additive being selected from the group consisting of: ammonia; water; sulfur dioxide; short-chain or long-chain polyethers; short-chain or long-chain amines; emulsion-forming agents; and short-chain or long-chain silicone oils.

16. The process of claim 15, further comprising removing substances extracted from said filler and in the compressed gas using a sorbent selected from the group consisting of: active charcoals; zeolites; silica; silica gels; and water.

17. The process of claim 14, wherein said silane-modified oxidic or silicatic filler is brought into contact with at least one additional additive in the compressed gas; said additive being selected from the group consisting of: ammonia; water; sulfur dioxide; short-chain or long-chain polyethers; short-chain or long-chain amines; emulsion-forming agents; and short-chain or long-chain silicone oils.

18. A device suitable for carrying out the compressed gas extraction step in the process of claim 1, said device comprising at least one pressure container, wherein said pressure container has:

a) at least one internal container, sieve or insert for accommodation of said filler and wherein said internal container, sieve or insert is permeable to said gas;
b) a cylindrical tube in the centre of and running parallel with said container, sieve or insert, said tube being permeable to said gas and forming a luminal space within said container, sieve or insert for the flow of gas into or out of said pressure container;

and wherein said pressure container is designed so that gas flows through the bulk bed of filler in a radial direction either into or out from said luminal space.

19. The device of claim 18, wherein said gas that said internal container, sieve or insert is permeable to is selected from the group consisting of: carbon dioxide; helium; nitrogen; dinitrogen monoxide; sulfur hexafluoride; gaseous alkanes having 1 to 5 C atoms; gaseous alkenes having 2 to 4 C atoms; gaseous alkynes; gaseous dienes; gaseous fluorohydrocarbons; chloro- and/or fluorochlorohydrocarbons; and ammonia.

20. The device of claim 18, wherein said central tube is a hollow pipe for the flow of gas.

* * * * *